United States Patent
Sivavakeesar

(10) Patent No.: US 11,405,974 B2
(45) Date of Patent: Aug. 2, 2022

(54) COMMUNICATION SYSTEM

(71) Applicant: NEC Corporation, Tokyo (JP)

(72) Inventor: Sivapathalingham Sivavakeesar, Milton Keynes (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/068,930

(22) PCT Filed: Jan. 6, 2017

(86) PCT No.: PCT/JP2017/000248
§ 371 (c)(1),
(2) Date: Jul. 10, 2018

(87) PCT Pub. No.: WO2017/122588
PCT Pub. Date: Jul. 20, 2017

(65) Prior Publication Data
US 2019/0021128 A1    Jan. 17, 2019

(30) Foreign Application Priority Data

Jan. 11, 2016 (GB) ..................................... 1600474
Jan. 15, 2016 (GB) ..................................... 1600791

(51) Int. Cl.
*H04W 76/19* (2018.01)
*H04W 76/27* (2018.01)
*H04W 4/70* (2018.01)
*H04W 92/20* (2009.01)
*H04W 36/00* (2009.01)

(52) U.S. Cl.
CPC ............. *H04W 76/19* (2018.02); *H04W 4/70* (2018.02); *H04W 76/27* (2018.02); *H04W 36/0033* (2013.01); *H04W 92/20* (2013.01)

(58) Field of Classification Search
CPC ..... H04W 76/27; H04W 76/19; H04W 36/08; H04W 76/30; H04W 36/0033; H04W 4/70; H04W 92/20; H04L 2209/80
See application file for complete search history.

(56) References Cited

U.S. PATENT DOCUMENTS

2008/0095195 A1*  4/2008  Ahmadi ............... H04L 5/0037
                                                   370/478
2013/0182563 A1    7/2013  Johansson et al.
(Continued)

FOREIGN PATENT DOCUMENTS

EP    2 418 910 A1    2/2012
EP    2 645 803 A1    10/2013
(Continued)

OTHER PUBLICATIONS

3GPP TR 23.720 V1.2.0, "3rd Generation Partnership Project; Technical Specification Group Services and System Aspects; Architecture enhancements for Cellular Internet of Things (Release 13)", Nov. 2015, pp. 1-96.
(Continued)

*Primary Examiner* — Mansour Oveissi
(74) *Attorney, Agent, or Firm* — Sughrue Mion, PLLC

(57) ABSTRACT

A system is disclosed in which a base station receives, from a communication device, a request for establishing a communication connection via the base station. The base station obtains information indicating from where a context associated with a previously established communication connection can be retrieved; retrieves the context associated with the previously established communication connection based on the obtained information; and resumes the previously established communication connection with the communication device using the retrieved context.

18 Claims, 12 Drawing Sheets

(56) References Cited

U.S. PATENT DOCUMENTS

| | | | |
|---|---|---|---|
| 2013/0260740 A1 | 10/2013 | Rayavarapu | |
| 2013/0260810 A1 | 10/2013 | Rayavarapu | |
| 2015/0237540 A1 | 8/2015 | Van Lieshout et al. | |
| 2016/0278160 A1* | 9/2016 | Schliwa-Bertling | ........................ H04W 72/048 |
| 2018/0310359 A1* | 10/2018 | Takahashi | ......... H04W 74/0833 |
| 2018/0332462 A1* | 11/2018 | Kim | ...................... H04W 28/02 |
| 2018/0352448 A1* | 12/2018 | Ryu | ........................ H04W 8/04 |
| 2019/0059119 A1* | 2/2019 | Hapsari | ................ H04W 76/10 |

FOREIGN PATENT DOCUMENTS

| | | |
|---|---|---|
| JP | 2015-500596 A | 1/2015 |
| WO | 2008/087524 A2 | 7/2008 |
| WO | 2011/063290 A1 | 5/2011 |

OTHER PUBLICATIONS

3GPP TS 22.368 V13.1.0, "3rd Generation Partnership Project; Technical Specification Group Services and System Aspects; Service requirements for Machine-Type Communications (MTC); Stage 1 (Release 13)", Dec. 2014, pp. 1-26.
Ericsson, "User plane based solution with AS information stored in RAN", 3GPP TSG-RAN WG3 Meeting #90, R3-152686, Nov. 16-20, 2015, pp. 1-5, Anaheim, CA, U.S.A.
Ericsson, "RRC Connection Suspend and Resume", 3GPP TSG-RAN WG2 #92, Tdoc R2-156395, Nov. 16-20, 2015, pp. 1-11, Anaheim, CA, U.S.A.
British Search Report of GB1600791.6 dated Jun. 21, 2016.
International Search Report of PCT/JP2017/000248 dated Mar. 31, 2017 [PCT/ISA/210].
Written Opinion of PCT/JP2017/000248 dated Mar. 31, 2017 [PCT/ISA/237].
HTC, "RRC aspects in NB-IoT", 3GPP TSG-RAN2 Meeting #92 R2-156425, Anaheim, USA, Nov. 16-20, 2015, 19 pages total.
Notice of Reasons of Refusal dated May 21, 2019 issued by the Japanese Patent Office in counterpart application No. 2018-534888.
NTT DoCoMo, Inc., "Work on user plane based solution with AS information stored in RAN", 3GPP TSG-RAN WG2 #92, R2-156424, Nov. 16-20, 2015, Anaheim, CA, USA, 12 pages total.
Notice of Reasons of Refusal dated Jul. 30, 2019 issued by the Japanese Patent Office in counterpart application No. 2018-534888.

* cited by examiner

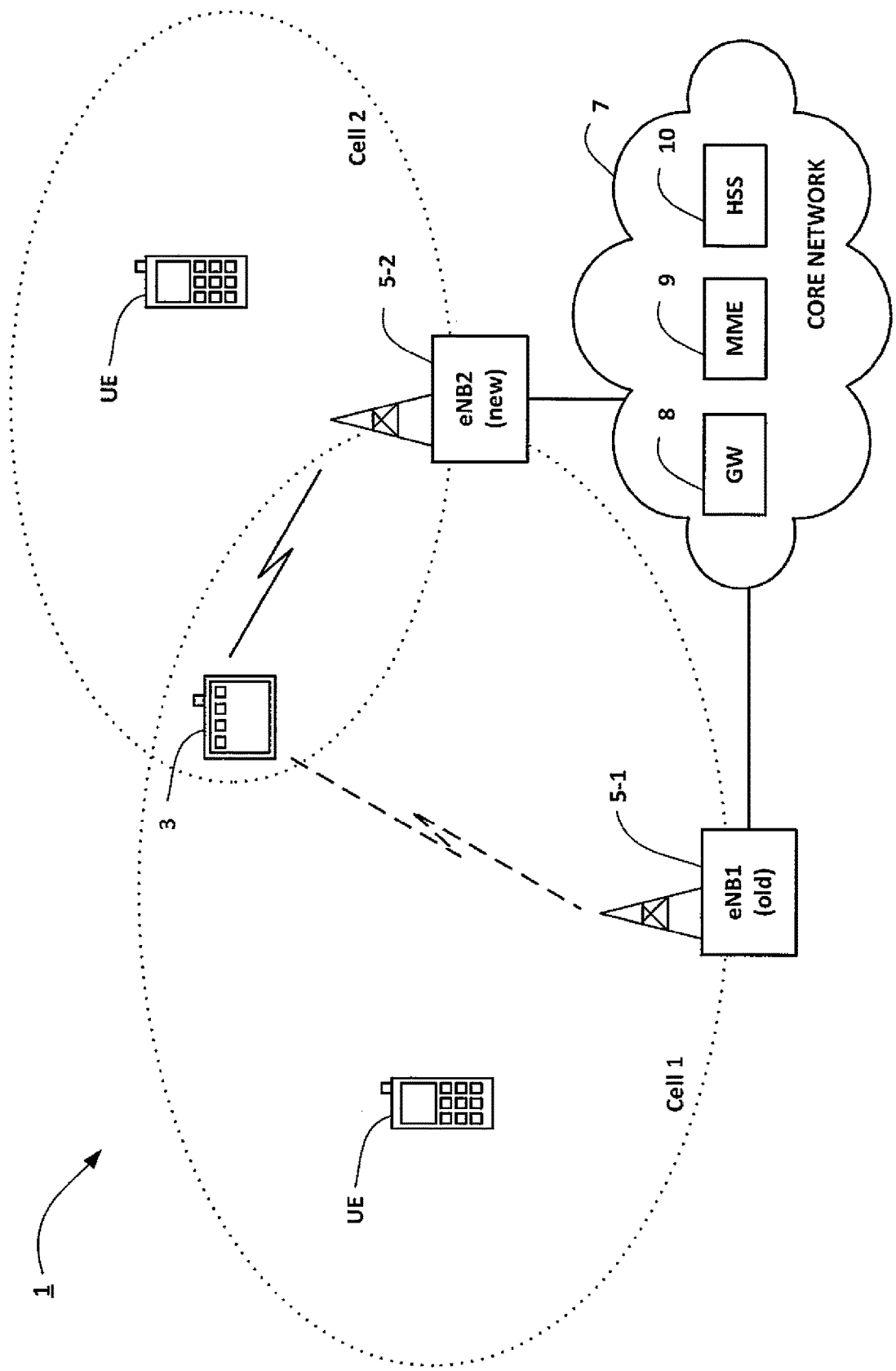
[Fig. 1]

[Fig. 2]
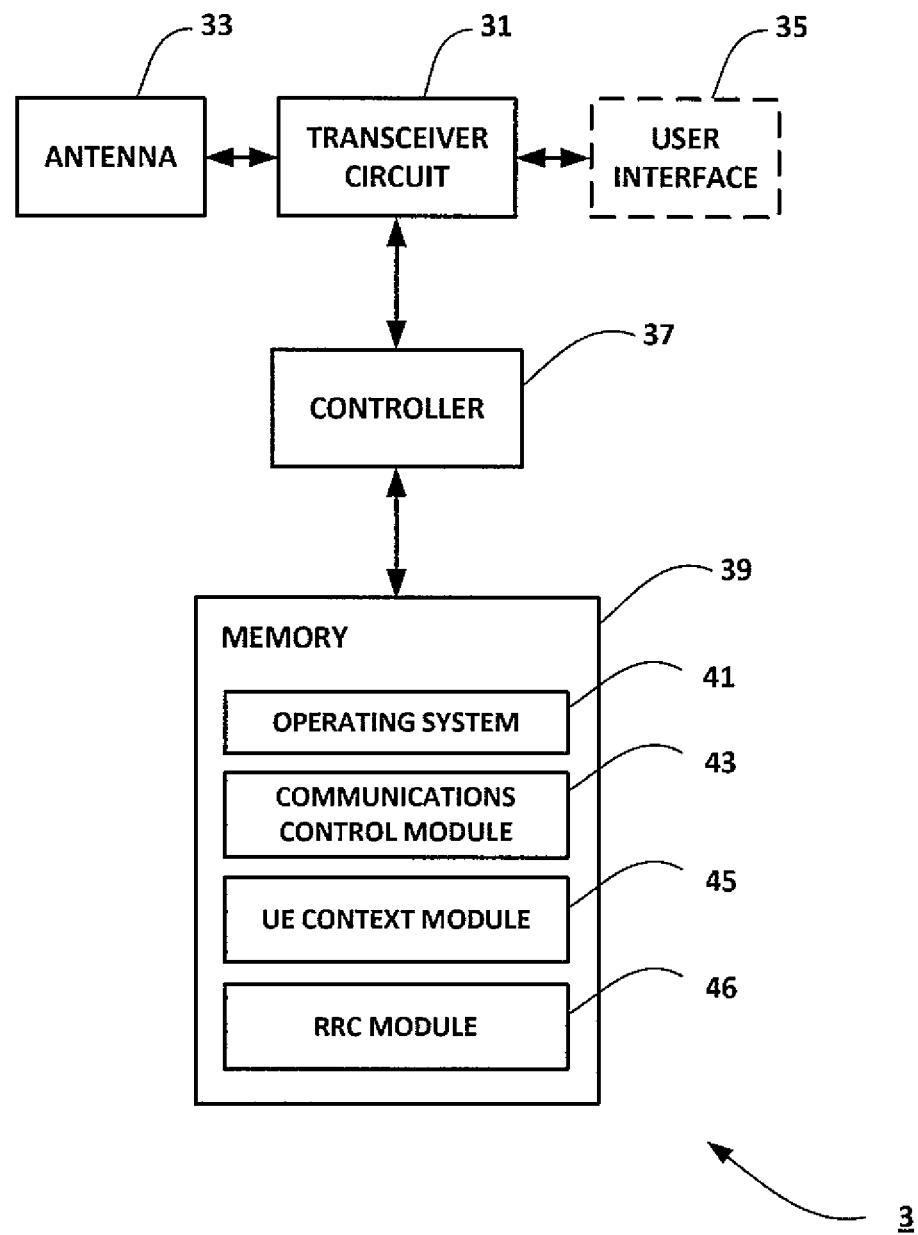

[Fig. 3]
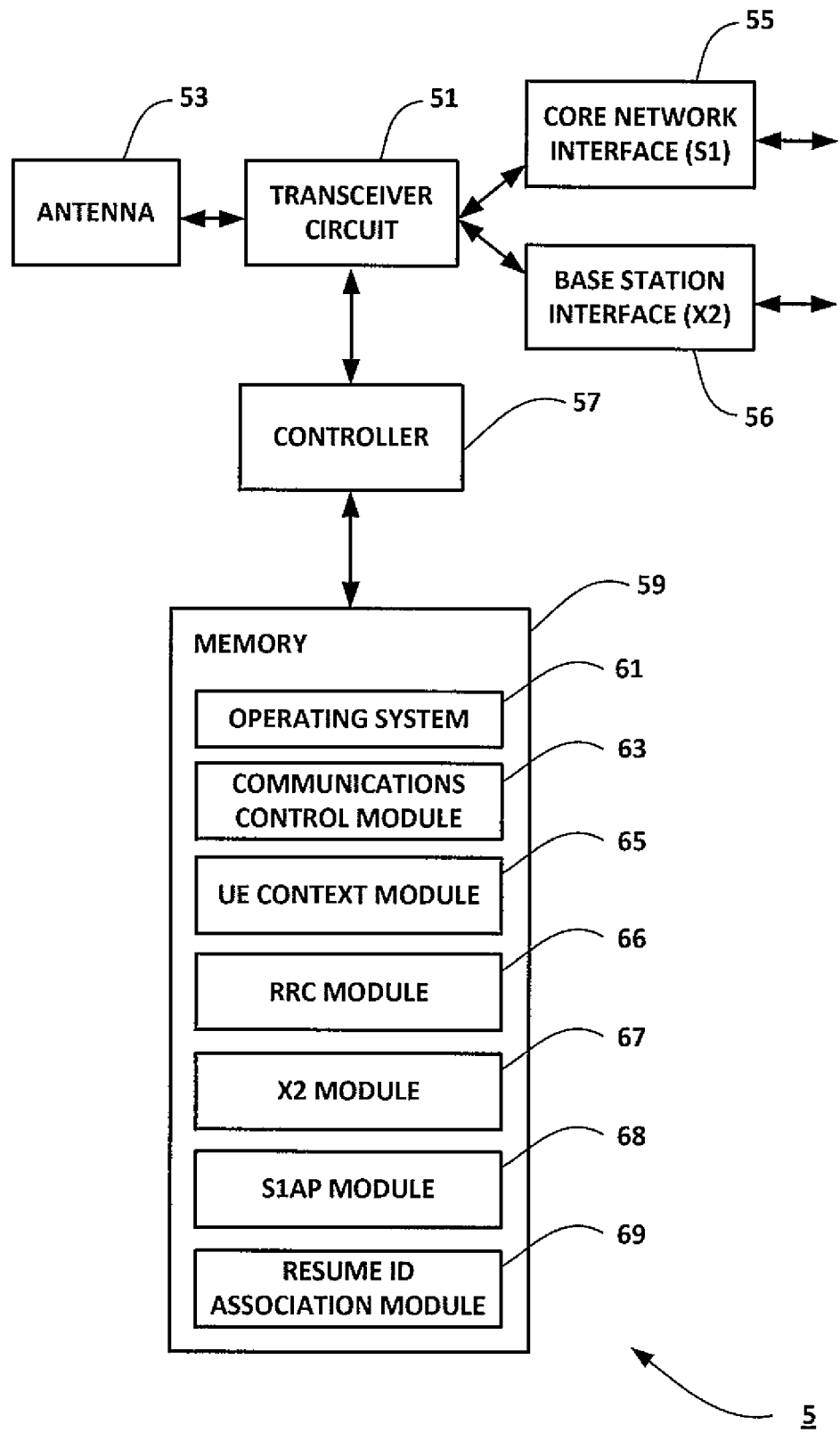

[Fig. 4]
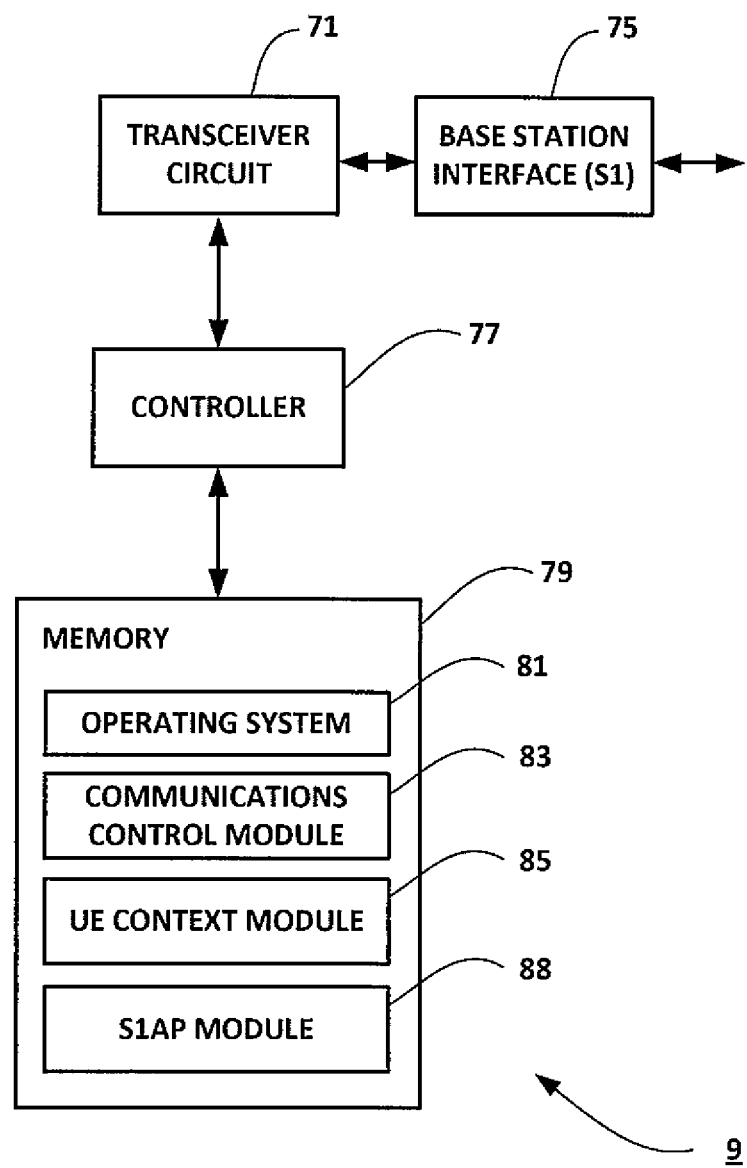

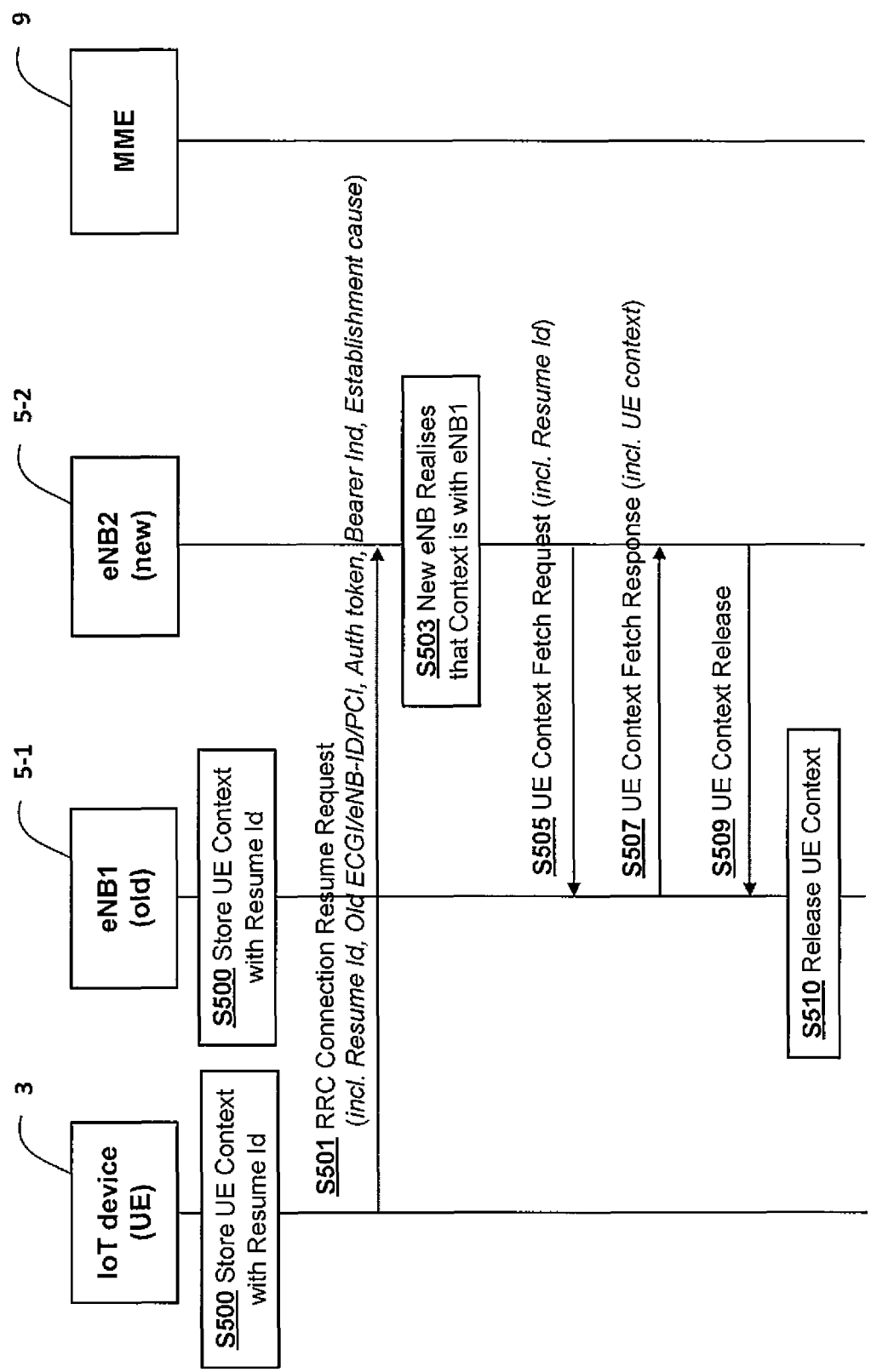
[Fig. 5]

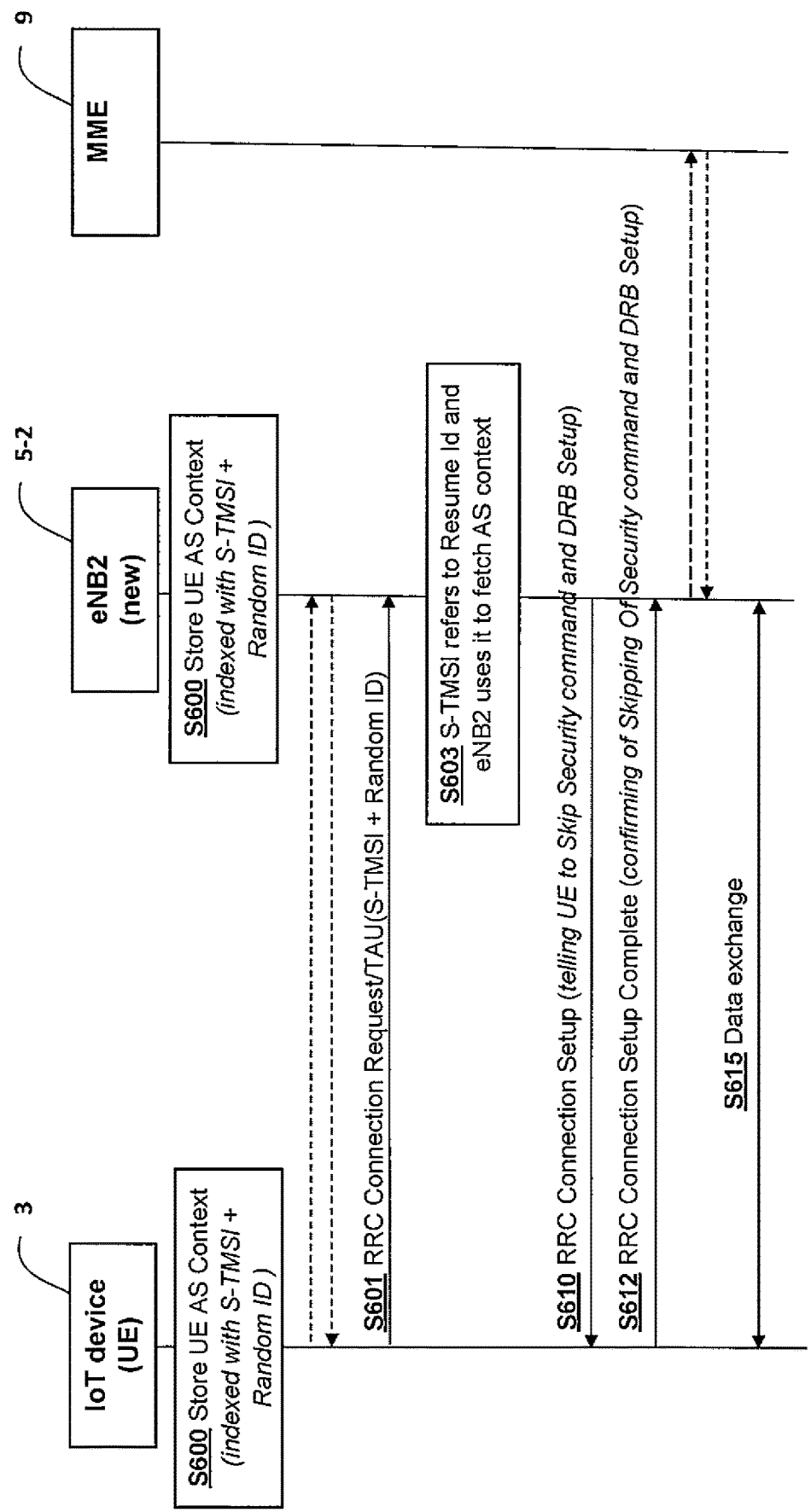
[Fig. 6]

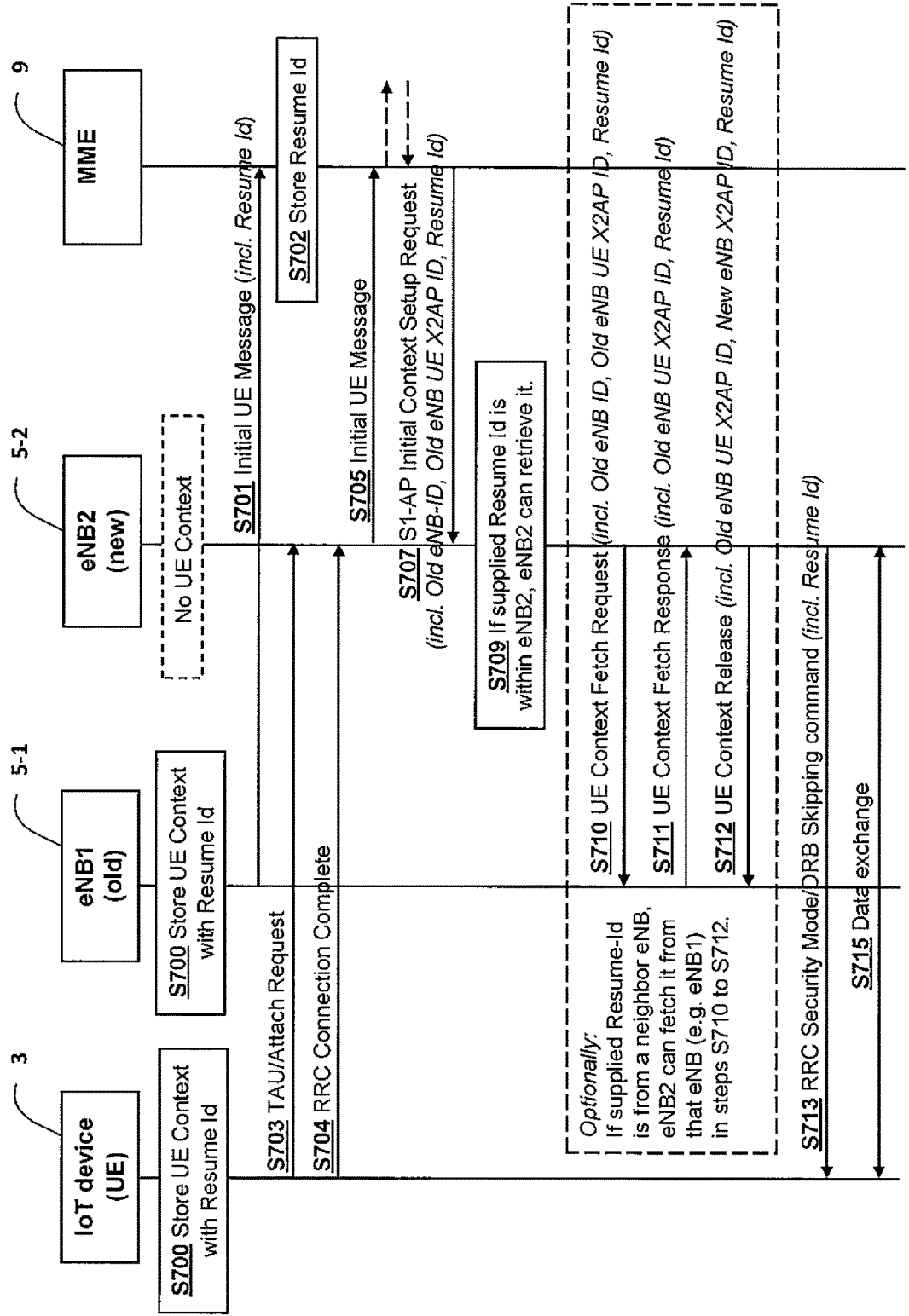
[Fig. 7]

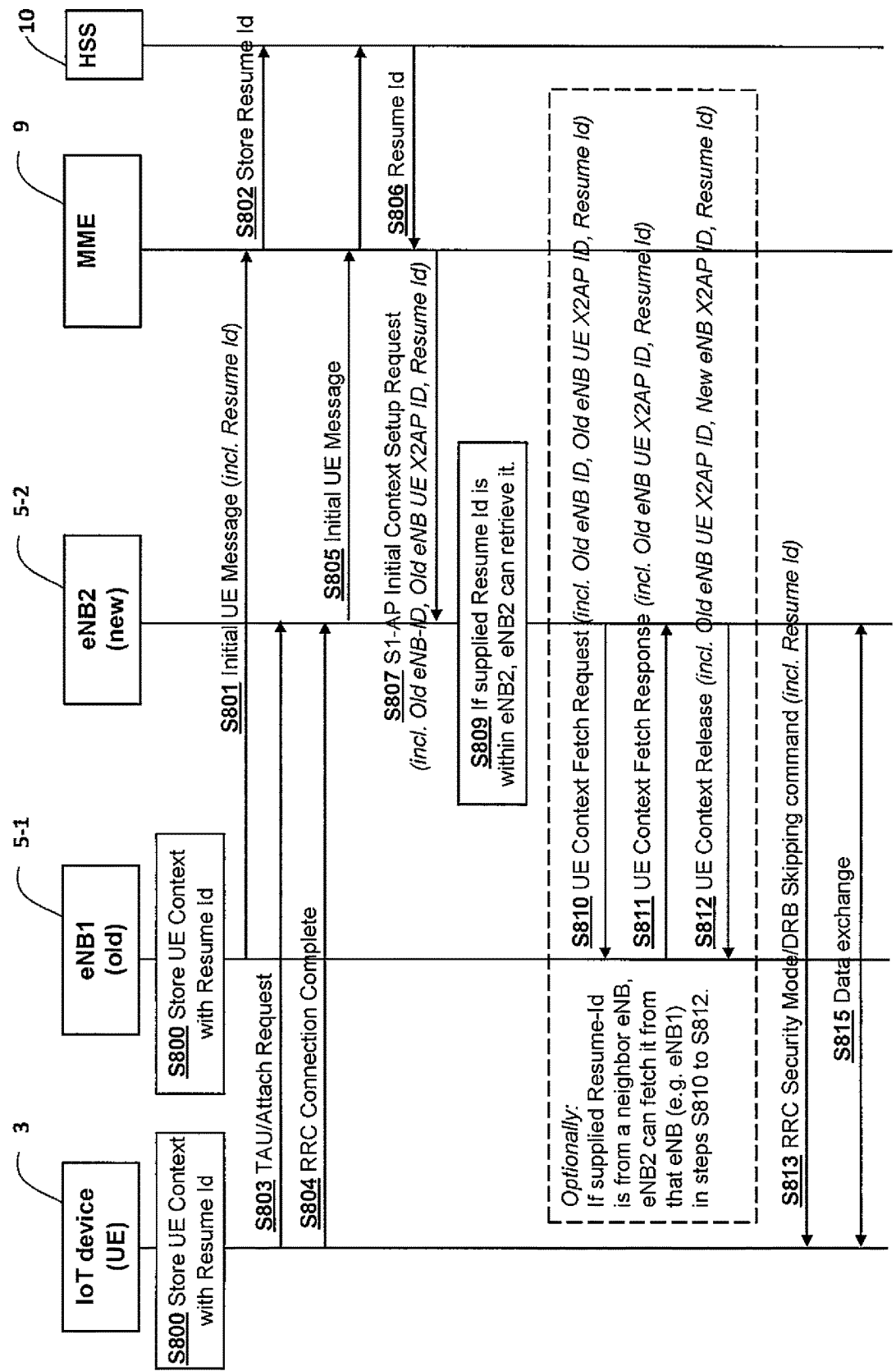

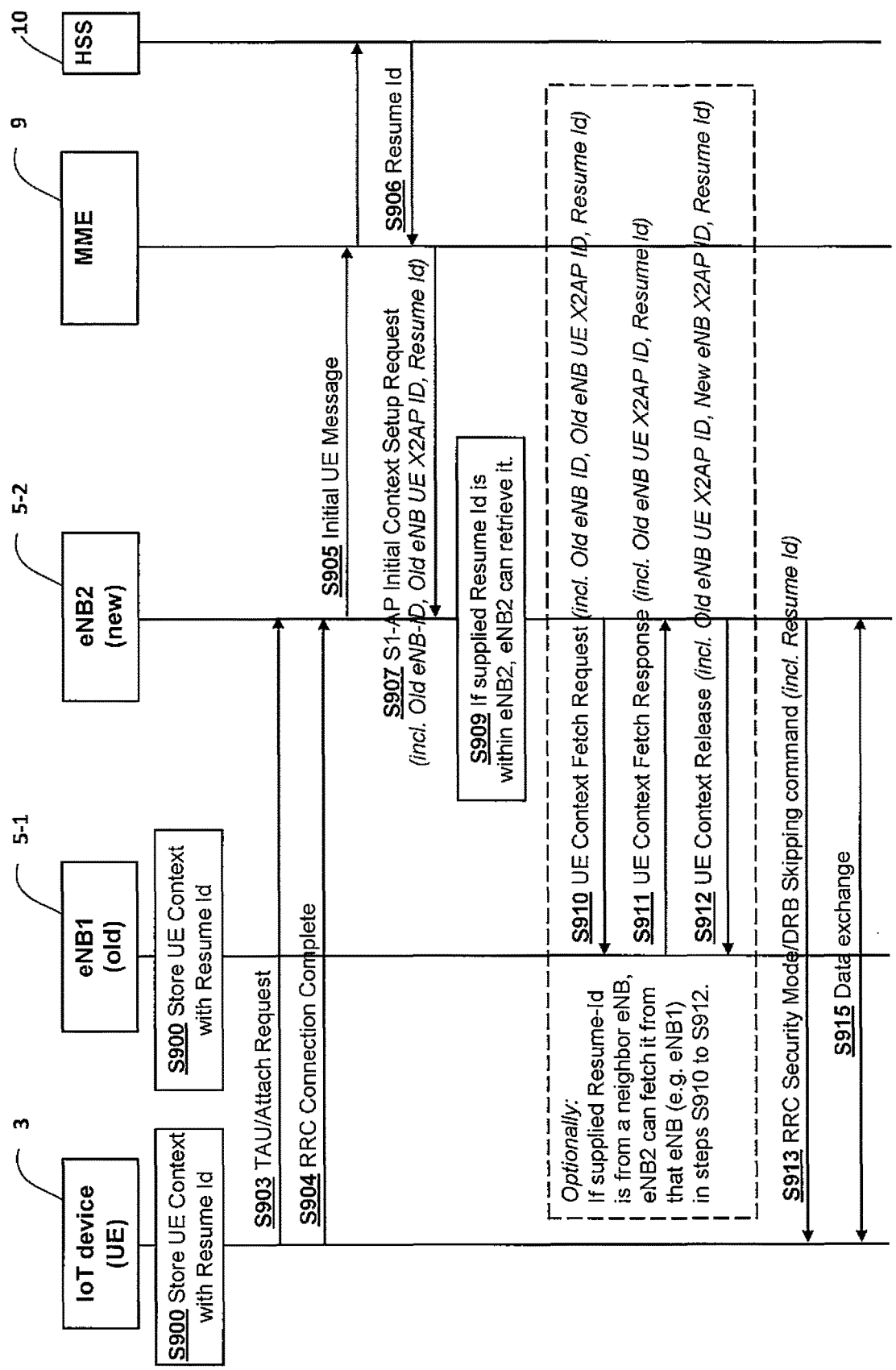

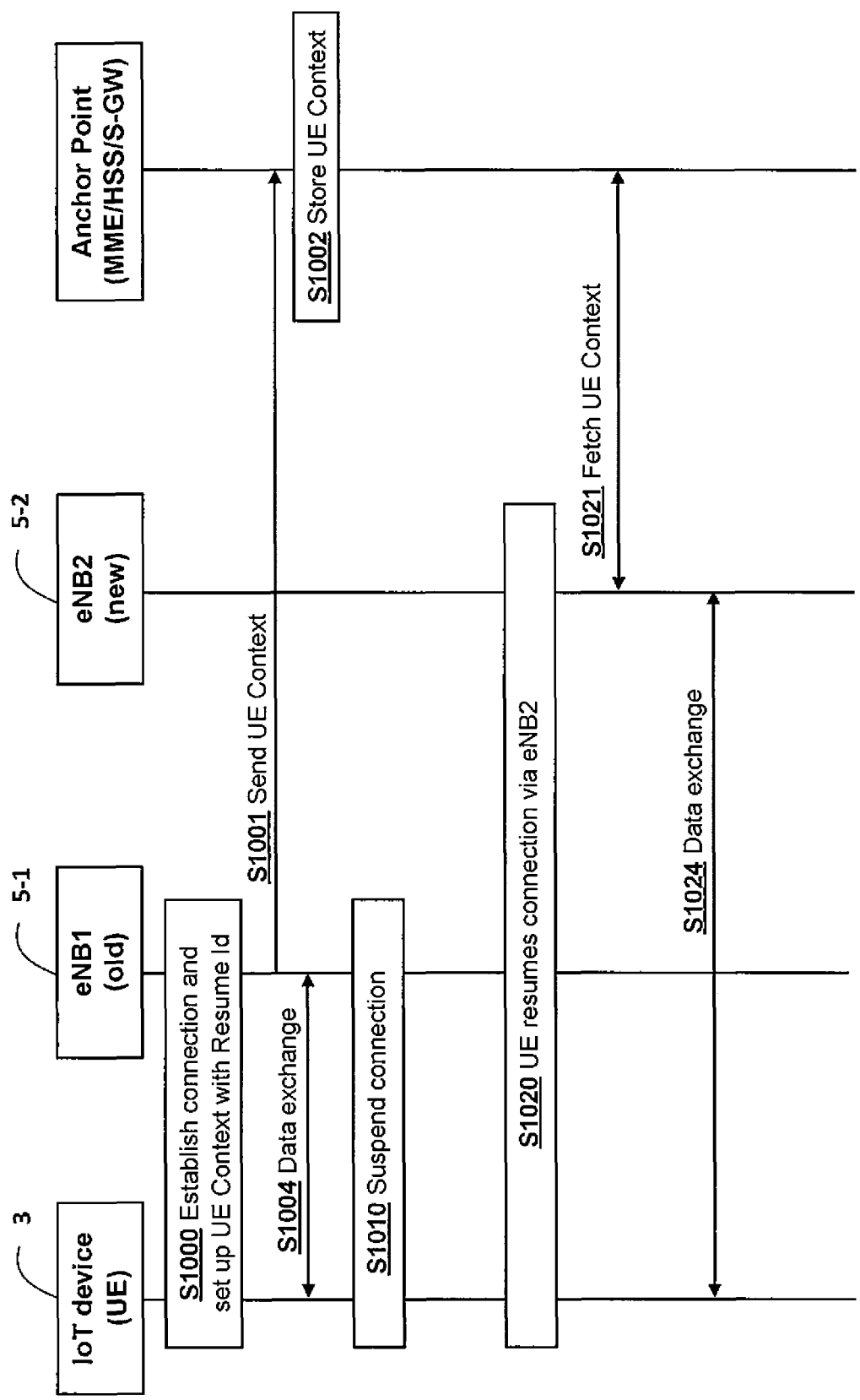

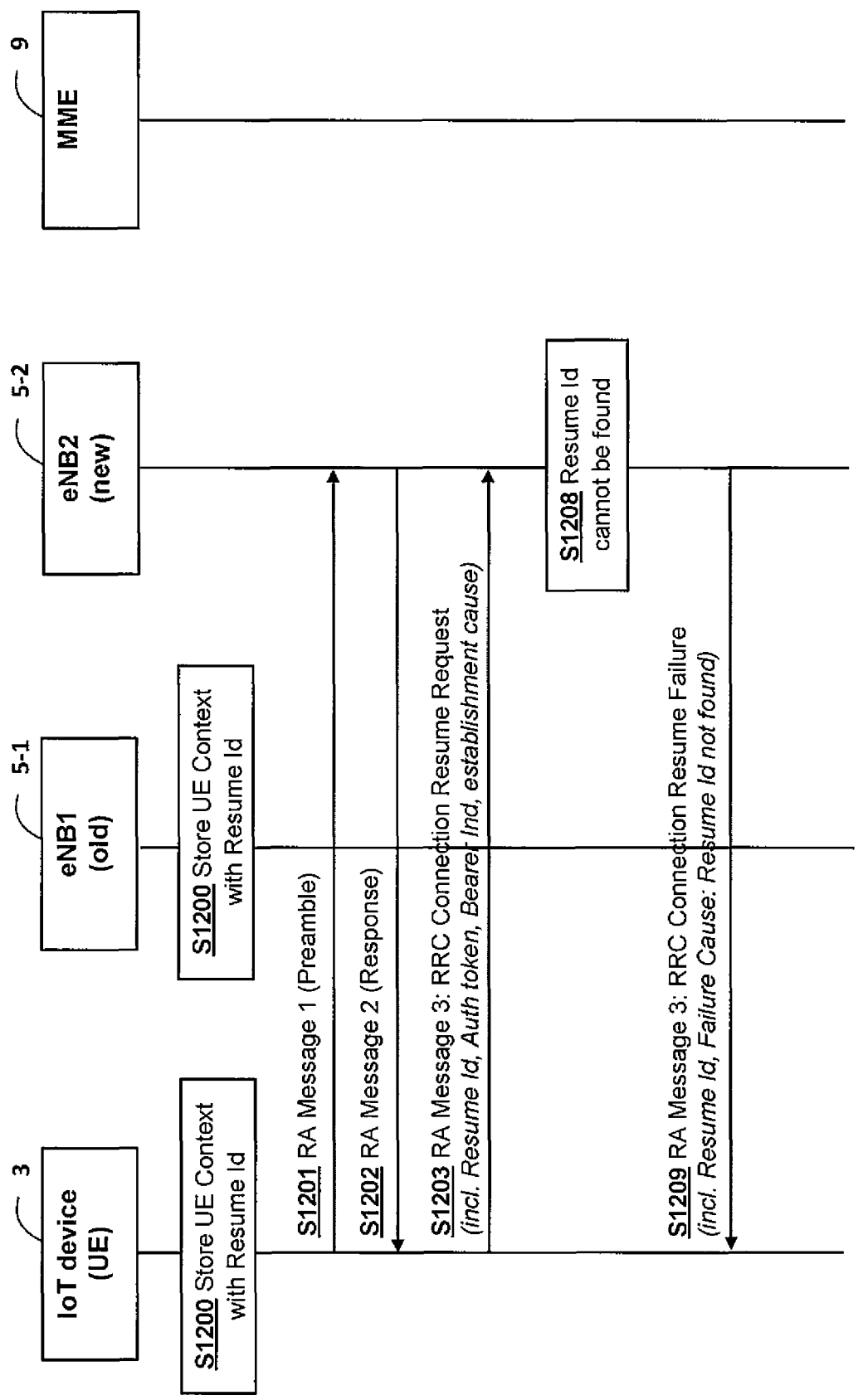
[Fig. 11]

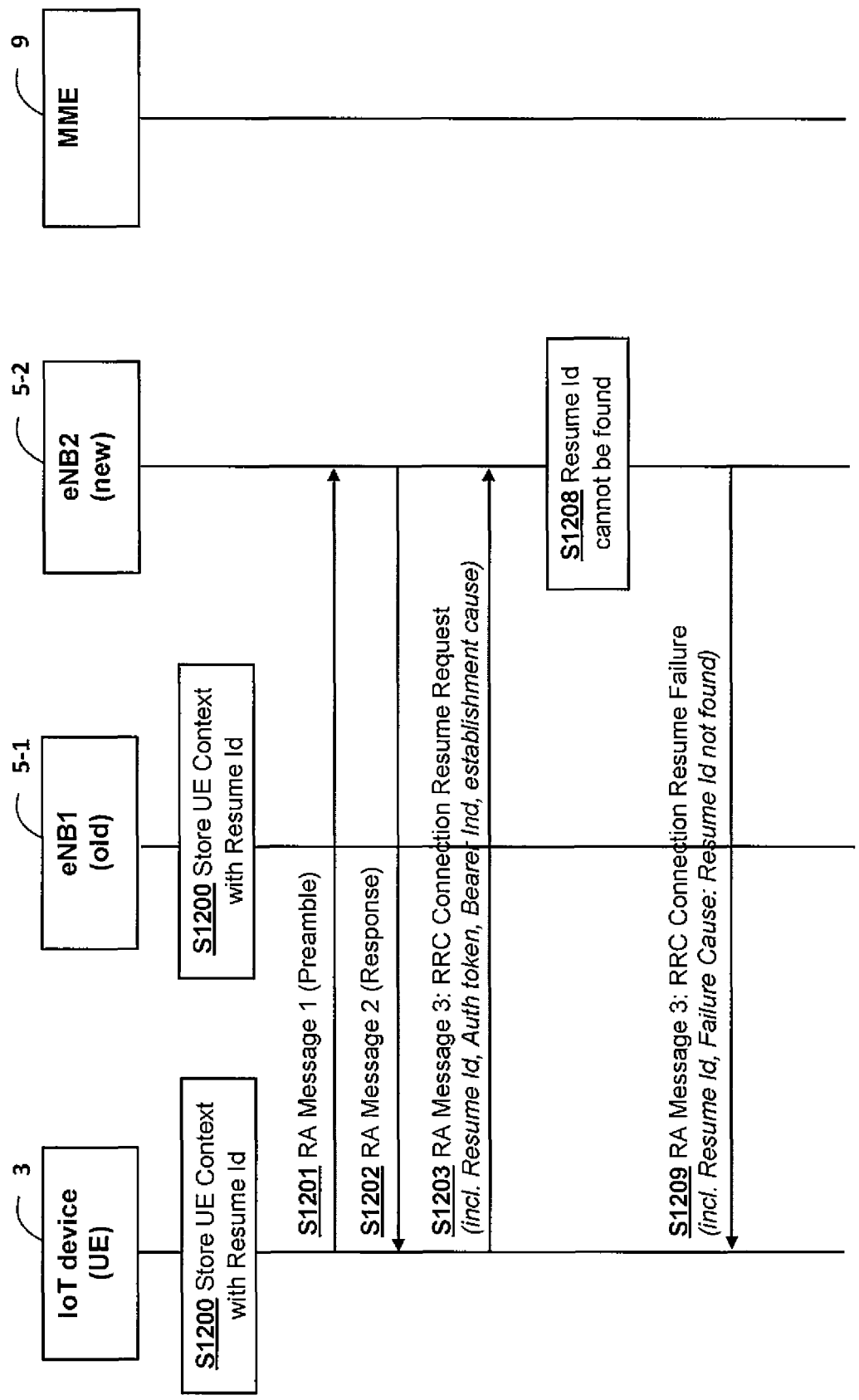
[Fig. 12]

COMMUNICATION SYSTEM

CROSS REFERENCE TO RELATED APPLICATIONS

This application is a National Stage of International Application No. PCT/JP2017/000248, filed Jan. 6, 2017, claiming priority based on British Patent Application No. 1600474.9, filed Jan. 11, 2016 and British Patent Application No. 1600791.6, filed Jan. 15, 2016, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to data transmissions by 'Internet of Things' devices and/or similar (narrowband) communication devices.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN). Under the 3GPP standards, a NodeB (or an eNB in LTE) is the base station via which communication devices connect to a core network and communicate to other communication devices or remote servers. For simplicity, the present application will use the term base station to refer to any such base stations. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. It will be appreciated that IoT devices are sometimes also referred to as Machine-Type Communication (MTC) communication devices or Machine-to-Machine (M2M) communication devices. However, IoT devices form a special subset of MTC devices because of their strict narrow-band requirement and/or energy conservation needs (e.g. battery may not be replaced for several years).

Effectively, the Internet of Things is a network of devices (or "things") equipped with appropriate electronics, software, sensors, network connectivity, and/or the like, which enables these devices to collect and exchange data with each other and with other communication devices. For simplicity, the present application refers to IoT devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

IoT devices connect to the network to send to or receive data from a remote 'machine' (e.g. a server) or user. IoT devices use communication protocols and standards that are optimised for mobile telephones or similar user equipment. However, IoT devices, once deployed, typically operate without requiring human supervision or interaction, and follow software instructions stored in an internal memory. IoT devices might also remain stationary and/or inactive for a long period of time. The specific network requirements to support IoT devices have been dealt with in the 3GPP technical report (TR) 23.720 V1.2.0, the contents of which are incorporated herein by reference. Further network requirements relating to IoT devices (and other MTC devices in general) are disclosed in 3GPP TS 22.368 standard V13.1.0.

IoT devices are generally designed to be able to operate without human supervision for as long as possible. For example, IoT devices can be programmed to autonomously set up a connection to report an event and then to go back to a low-power mode of operation, such as a sleep mode, stand-by mode, and the like.

Ensuring battery longevity of devices is one of the utmost design considerations of NB-IoT work. Battery longevity is made possible by keeping certain tasks such as data storing and retrieval to a minimum while making IoT devices simpler. As a result, quick data transmission and associated power savings can be achieved.

3GPP considered a number of solutions for enabling lightweight data transmission for NB-IoT devices. According to one solution shortlisted by 3GPP (referred to as 'Solution 2'), data may be transmitted over non-access stratum (DONAS). Another shortlisted solution ('Solution 18') facilitates lightweight data transmission on the user plane by cutting short the number of message cycles required. Further details of Solution 18 may be found in 3GPP R3-152686 (titled "User plane based solution with AS information stored in RAN") and TR 23.720 ("Architecture enhancements for Cellular Internet of Things"), the entire contents of which documents are incorporated herein by reference.

The present invention seeks to address (at least partially) some of the issues concerning Solution 18 without significantly compromising on the requirement for providing a lightweight solution for IoT devices having the need to conserve energy and designed to operate over a narrow-band spectrum (and in large numbers, in the order of millions of devices in a real deployment).

One goal of Solution 18 is to reduce the signalling overhead associated with IoT transmission and to reduce a related processing load in the network. In order to achieve this goal, a new behaviour is expected from some of the involved network nodes (e.g. the UE/IoT device, base station (eNB), mobility management entity (MME), and the serving gateway). Specifically, Solution 18 requires the following:

caching of AS-level information necessary to operate a radio resource control (RRC) connection (for a particular IoT device) and keep this information in both the E-UTRAN and the IoT device (UE) while the IoT device (UE) is in RRC_IDLE mode;

support the function on a base station (eNB) basis;

the S1-MME UE-associated signalling connection (for a particular IoT device) is kept between the base station (eNB) and the MME while that IoT device (UE) is in RRC_IDLE mode;

two new procedures, suspend and resume, are introduced with main impact on RRC and S1AP;

the bearer context data (for a particular IoT device) is kept in the base station (eNB) and the MME associated with that IoT device; and the suspend and resume procedures also require interaction between the MME and the serving gateway (S-GW) associated with the IoT device concerned.

Moreover, it is also foreseen that for the network initiated resume case, the paging message (for a particular IoT device) is allowed to be sent within the already established UE-associated signalling connection (for that IoT device). When paging is successful within a cell of the base station that holds the suspended UE Context (for the IoT device being paged), the resume procedure is triggered.

SUMMARY OF INVENTION

Technical Problem

If the base station cannot find the UE Context addressed by the AS reference provided by the IoT device (UE), then the IoT device needs to perform legacy Service Request/RRC Connection Setup procedures. Moreover, a normal UE Context Release procedure may also be performed by the MME towards the "old" base station associated with the IoT device (i.e. the last/previous serving base station known to the MME).

It will be appreciated that (although most IoT devices do not move and/or move infrequently) due to shadowing, fading, and/or other wireless impairments, IoT devices may switch their cell/eNB point of attachment from one cell/base station to another.

When switching between cells/base stations, if an associated UE context is not found in the new base station for a particular IoT device (based on the so-called 'Resume ID' supplied by the IoT device), the IoT device needs to fall back to the so-called Legacy Attach procedure. However, this Legacy Attach procedure often results in a waste of energy and spectrum, which would defeat the whole purpose of Solution 18. Furthermore, the old cell/base station will continue to keep the associated UE context without knowing that the IoT device in question has already attached to another (e.g. neighbouring) base station. Currently, it is not possible to pass the UE context on to the correct new base station and release the UE context in the old base station in a timely manner. There is also no suitable mechanism for the new base station to inform a particular IoT device that the provided Resume ID is not valid.

The inventors have realised that it is not trivial to keep IoT devices (and/or similar UEs) as simple as possible without providing complicated procedures for determining when to send an RRC Connection Resume Request to the newly selected base station and when to fall back to Legacy RRC Connection Setup. It is also important to provide a solution that is applicable to normal UEs (e.g. for UEs changing cells/base stations in IDLE-mode).

Accordingly, preferred example embodiments of the present invention aim to provide methods and apparatus which address or at least partially deal with the above needs.

Although for efficiency of understanding for those of skill in the art, the invention will be described in detail in the context of a 3GPP system (UMTS, LTE), the principles of the invention can be applied to other systems in which communication devices or User Equipment (UE) access a core network using a radio access technology.

Solution to Problem

In one aspect, the invention provides a base station for a communication network, the base station comprising: a transceiver configured to: receive, from a communication device, a request for establishing a communication connection via a cell of the communication network operated by the base station; and a controller configured to: obtain information indicating from where a context associated with a previously established communication connection can be retrieved; and retrieve the context associated with the previously established communication connection based on the obtained information; wherein the base station is configured to resume the previously established communication connection with the communication device using the retrieved context.

In another aspect, the invention provides a communication device for communicating via a cell of a communication network operated by a base station, the communication device comprising: a memory configured to hold a context associated with a previously established communication connection; a transceiver configured to: send, to the base station, a request for establishing a communication connection via a cell of the communication network operated by the base station, wherein the request for establishing a communication connection includes: information indicating that the communication device has a previously established communication connection with the communication network; and information indicating from where a context associated with the previously established communication connection can be retrieved; and a processor configured to resume the previously established communication connection, with the base station, using the context.

In another aspect, the invention provides a base station for a communication network, the base station comprising: a controller configured to: establish a communication connection with a communication device and set up an associated context; and determine whether the communication connection is suspended; and a transceiver configured to: transfer said context to another communication node upon at least one of: the controller establishing the communication connection; the controller determining that the communication connection is suspended; and upon request.

In another aspect, the invention provides communication apparatus for a communication network, the communication apparatus comprising: a transceiver configured to receive, from a base station, a context associated with a communication connection involving the base station and a communication device; a memory configured to store the received context; and a controller configured to retrieve the stored context from memory and to initiate transfer, by the transceiver, of the retrieved context towards one of: the base station from which the context was originally received; and another base station; wherein said controller is configured to retrieve the stored context and to initiate said transfer upon receipt of information indicating that the communication connection is to be resumed and identifying said stored context.

In another aspect, the invention provides a base station for a communication network, the base station comprising: a transceiver configured to: receive, from a communication device, a request for establishing a communication connection via a cell of the communication network operated by the base station; and a controller configured to: obtain information indicating from where a context associated with a previously established communication connection can be retrieved; and determine that the context associated with the previously established communication connection cannot be retrieved; wherein the transceiver is configured to send to the communication device and responsive to said determination that the context associated with the previously established communication connection cannot be retrieved, a message indicating that the previously established communication connection cannot be resumed.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied.

FIG. 2 is a block diagram of an IoT device forming part of the system shown in FIG. 1.

FIG. 3 is a block diagram of a base station forming part of the system shown in FIG. 1.

FIG. 4 is a block diagram of a mobility management entity forming part of the system shown in FIG. 1.

FIG. 5 is a timing diagram illustrating an exemplary way in which an example embodiment of the invention can be implemented in the system of FIG. 1.

FIG. 6 is a timing diagram illustrating a further exemplary way in which an example embodiment of the invention can be implemented in the system of FIG. 1.

FIG. 7 is a timing diagram illustrating a further exemplary way in which an example embodiment of the invention can be implemented in the system of FIG. 1.

FIG. 8 is a timing diagram illustrating a further exemplary way in which an example embodiment of the invention can be implemented in the system of FIG. 1.

FIG. 9 is a timing diagram illustrating a further exemplary way in which an example embodiment of the invention can be implemented in the system of FIG. 1.

FIG. 10 is a timing diagram illustrating a further exemplary way in which an example embodiment of the invention can be implemented in the system of FIG. 1.

FIG. 11 is a timing diagram illustrating a further exemplary way in which an example embodiment of the invention can be implemented in the system of FIG. 1.

FIG. 12 is a timing diagram illustrating a further exemplary way in which an example embodiment of the invention can be implemented in the system of FIG. 1.

DESCRIPTION OF EMBODIMENTS

<Overview>

FIG. 1 schematically illustrates a telecommunications network 1 in which IoT devices 3, mobile telephones (denoted 'UE'), and other communication devices (not shown) can communicate with each other via E-UTRAN base stations 5 and a core network 7 using an E-UTRA radio access technology (RAT). As those skilled in the art will appreciate, whilst one IoT device 3, two mobile telephones, and two base stations 5-1, 5-2 are shown in FIG. 1 for illustration purposes, the system, when implemented, will typically include other base stations and communication devices.

Each base station 5 operates one or more associated cell. In this example, the first base station 5-1 operates 'Cell 1' and the second base station 5-2 operates 'Cell 2'. Communication devices may connect to either cell (depending on their location and possible on other factors, e.g. signal conditions, subscription data, capability, and/or the like) by establishing a radio resource control (RRC) connection with the appropriate base station 5 operating that cell. As can be seen, the IoT device 3 is located in an area where the cells operated by the base stations 5-1 and 5-2 partially overlap. Thus, when operating in RRC idle mode (not sending/receiving data), the IoT device 3 camps on the cell having the best signal quality, and when in RRC active mode, the IoT device 3 communicates data via that cell.

The base stations 5 are connected to the core network 7 via an S1 interface and to each other via an X2 interface (not shown). The core network 7 includes a gateway 8 for connecting to other networks, such as the Internet and/or to servers hosted outside the core network 7.

A mobility management entity (MME) 9 is the network node responsible for keeping track of the locations of the mobile communication devices (the mobile telephones and the IoT device 3) in the IDLE-MODE within the communications network 1. In particular, the MME 9 stores an identifier of the mobile communication devices' last known cell (or tracking area) so that they can be notified when there is an incoming (voice or data) call for them and that a communication path is set up via the base station 5 currently serving the particular mobile communication device.

A home subscriber server (HSS) 10 stores subscription related information and control parameters specific for each communication device (e.g. the IoT device 3 and the mobile telephones). The HSS 10 also stores information identifying which ones of the communication devices are configured as machine-type communication devices (e.g. the IoT device 3 or mobile telephone when it is running an IoT/MTC client) and provides this information to the other network entities when needed.

In the following examples, the IoT device 3 connects to the network at specific intervals (and/or whenever one of its application needs to communicate with the network) for sending data to a remote server (or another communication device). The operation of the IoT device 3 of this embodiment is automated and capable of operating essentially autonomously. It will be appreciated, however, that the IoT device 3 may perform certain activities based on inputs received from a local or a remote user (e.g. remote (re) configuration of measurement criteria or out of schedule measurement performance and/or reporting). In addition, the IoT device 3 may be operated by a user in a similar manner as a mobile telephone.

As illustrated by a dashed arrow, the IoT device 3 previously connected to the first base station 5-1 (via Cell 1) and thus the first base station 5-1 maintains an associated UE context. However, as illustrated by an arrow in continuous line, the IoT device 3 now attempts to connect to the second base station 5-2 (via Cell 2).

In order to ensure that the target base station 5-2 is able to obtain the UE context associated with the IoT device 3 (and/or any other user equipment), and thus resume the existing connection for the IoT device 3 (UE), the following options are envisaged.

According to a first option, the IoT device 3 (user equipment) sends an explicit resume request (such as an RRC Connection Resume Request and/or the like) and includes in this request information identifying the connection to be resumed. For example, the IoT device 3 may provide a so-called Resume ID and/or information identifying its previous cell/base station from which the target base station 5-2 is able to obtain the UE context required for resuming the IoT device's connection. For example, the Resume ID and/or information identifying the previous cell/base station may be provided explicitly, in the form of one or more appropriate information elements (IEs) within the resume request. It will also be appreciated that the IoT device 3 may be configured to construct the Resume-ID in such a way that it includes information suitable for identifying the old base station from which the target base station 5-2 can obtain the UE context.

The information identifying the previous cell/base station may comprise, for example, an E-UTRAN Cell Global ID (ECGI) of the old/previous cell and/or the like. If the target base station 5-2 has the UE context referred to by the Resume ID, then it continues to use that UE context and resume the connection for the IoT device 3 (UE) without requiring extended signalling (normally performed when establishing a connection with a base station) and without an associated delay and/or battery usage. If the target base station 5-2 does not have any UE context associated with the supplied Resume ID, it proceeds to fetch the UE context from the identified base station (e.g. the base station corresponding to the ECGI) before resuming the connection for the IoT device 3.

According to a second option, the IoT device 3 (user equipment) sends a regular connection request (e.g. an RRC Connection Request, tracking area update request, and/or the like) rather than an explicit resume request. However, in this case the IoT device 3 (UE) also includes in this request information identifying the connection to be resumed. It will be appreciated that instead of (or in addition to) providing information identifying the previous cell/base station explicitly (using one or more dedicated IEs), the IoT device 3 may be configured to construct the Resume-ID in such a way that it includes information suitable for identifying the old base station (and/or other node having the UE context) from which the target base station 5-2 can obtain the UE context. For example, the S-TMSI (together with a Random number) may be used as the Resume ID (or instead of the Resume ID). In this case, the S-TMSI may be constructed such that it can indicate where to get the UE context from. For example, the S-TMSI may include at least one of an ECGI, PCI, eNB-ID, an MME-ID (and/or the) like associated with (the location of) the UE context.

Beneficially, if the target base station 5-2 is able to obtain the UE context (e.g. from its own memory or from another node) during the regular connection request procedure, it can be configured to skip at least a part of the connection request procedure (e.g. a handshake operation) in order to resume the IoT device's existing connection without extended signalling and without delay. This means that there is no need to carry out for some of the RRC Connection Resume Request related procedures, which in turn may contribute to keeping UE implementation simple and its operation lightweight.

According to a third option, the IoT device 3 (user equipment) sends a regular connection request (e.g. an attach request, tracking area update request, and/or the like) rather than an explicit resume request. In this case, however, the IoT device 3 does not include any Resume ID and/or information relating to the UE context for resuming a connection. Beneficially, in this option, the network nodes (e.g. the base stations, MME, HSS) are configured to indicate to the new base station, as part of the connection request procedure, where to obtain the UE context from. For example, the MME and/or the HSS may be configured to store a Resume ID for each IoT device/UE (e.g. when a connection for that IoT device/UE is suspended) and send this Resume ID to the new base station when the IoT device subsequently attempts to connect to the network via that new base station. The new base station is thus able to look up the Resume ID in its internal memory and restore the associated UE context (if found) and/or to obtain the UE context from the previous base station (or form another node, such as the MME, if applicable) based on the information received from the MME/HSS during the connection request procedure.

Beneficially, if an associated UE context is not found in a (new) base station for a particular Resume ID supplied by the IoT device/UE (or MME/HSS), there is no need to fall back to legacy attach procedure (which would be wasteful of energy and frequency spectrum) since the new base station is able to obtain the UE context based on the information provided by the IoT device upon requesting to resume/establish a connection via the new base station (provided that a context for that IoT device/UE is available at another node).

Moreover, there is no need for the old base station/cell to continue keeping the UE context for an IoT device once that IoT device has already attached to a neighbouring base station/cell. Accordingly, it will be appreciated that the new base station may be configured to inform the old base station about the resumed RRC connection and instruct the old base station to discard the UE context (after transferring it to the new base station).

The IoT device and the new base station also do not need to start setting up the UE context from scratch (when connecting via the new base station), since the existing UE context can be passed from the old base station (or another suitable anchor point, such as the MME, HSS, GW, etc.) to the new base station as part of the resume operation.

Beneficially, the MME can always use the already established UE-associated signalling for paging the IoT device, regardless whether or not the IoT device in question has changed its attachment point (e.g. from base station 5-1 to 5-2).

<IoT Device>

FIG. 2 is a block diagram illustrating the main components of the IoT device 3 shown in FIG. 1 (or a mobile telephone configured to operate as an IoT device 3). As shown, the IoT device 3 has a transceiver circuit 31 that is operable to transmit signals to and to receive signals from a base station 5 via one or more antenna 33. The IoT device 3 has a controller 37 to control the operation of the IoT device 3. The controller 37 is associated with a memory 39 and is coupled to the transceiver circuit 31. Although not necessarily required for its operation, the IoT device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the IoT device 3 by, in this example, program instructions or software instructions stored within memory 39. As shown, these software instructions include, among other things, an operating system 41, a communications control module 43, a UE context module 45, and an RRC module 46.

The communications control module 43 is operable to control the communication between the IoT device 3 and its serving base station 5 (and other communication devices connected to the serving base station 5, such as further IoT devices, mobile telephones, core network nodes, etc.).

The UE context module 45 is responsible for handling (such as obtaining, generating, modifying, storing, and/or transferring) UE context associated with the IoT device 3 for use in communicating via a serving base station 5.

The RRC module 46 is operable to generate, send and receive signalling messages formatted according to the RRC standard. For example, such messages are exchanged between the IoT device 3 and its serving base station 5. The RRC messages may include, for example, messages relating to resuming a previous RRC connection via a new serving base station 5.

<Base Station>

FIG. 3 is a block diagram illustrating the main components of a base station 5 shown in FIG. 1. As shown, the base station 5 has a transceiver circuit 51 for transmitting signals to and for receiving signals from the communication devices (such as IoT devices 3/mobile telephones) via one or more antenna 53, a core network interface 55 (e.g. an S1 interface) for transmitting signals to and for receiving signals from the core network 7, and a base station interface 56 (e.g. an X2 interface) for transmitting signals to and for receiving signals from neighbouring base stations. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, a UE context module 65, an RRC module 66, an X2 module 67, an S1AP module 68, and a Resume ID association module 69.

The communications control module 63 is operable to control the communication between the base station 5 and IoT devices 3, mobile telephones, and other network entities that are connected to the base station 5. The communications control module 63 also controls the separate flows of downlink user traffic and control data to be transmitted to the communication devices associated with this base station 5 including, for example, control data for managing operation of the IoT device 3 and/or the mobile telephones.

The UE context module 65 is responsible for handling (such as obtaining, generating, modifying, storing, and/or transferring) UE context associated with user equipment (e.g. the IoT device 3) connected to the base station 5.

The RRC module 66 is operable to generate, send and receive signalling messages formatted according to the RRC standard. For example, such messages are exchanged between the base station 5 and the IoT device 3 (and other communication devices within the cell of the base station 5). The RRC messages may include, for example, messages relating to resuming a previous RRC connection for an IoT device 3 via this base station 5 as a new serving base station.

The X2 module 67 is operable to generate, send and receive signalling messages (X2 messages) formatted according to the X2AP standard. The X2 messages may include, for example, messages relating to the transfer of UE context between neighbouring base stations.

The S1AP module 68 is operable to generate, send and receive signalling messages formatted according to the S1AP standard. For example, such messages are exchanged between the base station 5 and the mobility management entity 9. The S1AP messages may include, for example, messages relating to registering the location of the IoT device/user equipment in a cell of the base station (e.g. an Initial UE message and/or associated responses).

The Resume ID association module 69 handles and stores respective Resume IDs associated with each item of user equipment (e.g. the IoT device 3) connected to the base station 5.

Mobility Management Entity

FIG. 4 is a block diagram illustrating the main components of the mobility management entity 9 shown in FIG. 1. As shown, the mobility management entity 9 has a transceiver circuit 71 for transmitting signals to and for receiving signals from the base stations 5 (and/or communication devices connected to the base stations 5) via a base station interface 75 (e.g. an S1 interface). The mobility management entity 9 has a controller 77 to control the operation of the mobility management entity 9. The controller 77 is associated with a memory 79. Although not necessarily shown in FIG. 4, the mobility management entity 9 will of course have all the usual functionality of a cellular telephone network mobility management entity and this may be provided by any one or any combination of hardware, software and firmware, as appropriate. Software may be pre-installed in the memory 79 and/or may be downloaded via the communications network 1 or from a removable data storage device (RMD), for example. The controller 77 is configured to control the overall operation of the mobility management entity 9 by, in this example, program instructions or software instructions stored within memory 79. As shown, these software instructions include, among other things, an operating system 81, a communications control module 83, a UE context module 85, and an S1AP module 88.

The communications control module 83 is operable to control the communication between the mobility management entity 9 and the base stations 5, IoT devices 3, mobile telephones, and other network entities that are connected to the mobility management entity 9.

The UE context module 85 is responsible for handling (such as obtaining, generating, modifying, storing, and/or transferring) UE context associated with user equipment (e.g. the IoT device 3) connected to the MME 9.

The S1AP module 88 is operable to generate, send and receive signalling messages formatted according to the S1AP standard. For example, such messages are exchanged between the mobility management entity 9 and connected the base stations 5. The S1AP messages may include, for example, messages relating to registering the location of the IoT device/user equipment in a cell of a base station (e.g. an Initial UE message and/or associated responses).

In the above description, the IoT device 3, the base station 5, and the mobility management entity 9 are described for ease of understanding as having a number of discrete modules (such as the communications control modules and the UE context/UE context setup modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 5 to 10) of the scenario discussed above where an IoT device 3 resumes its data connection with the network via a new base station.

Operation—First Embodiment

FIG. 5 is a flowchart illustrating an example process performed by components of the system 1 when performing a resumption of a data connection for an IoT device 3 (or a UE) via a different base station (that does not have the UE context associated with this IoT device 3/UE).

Initially, as generally shown in step S500, the IoT device 3 and the old base station 5-1 store the UE context and the Resume ID associated with the IoT device 3. It will be appreciated that this UE context was generated during an earlier RRC connection between the IoT device 3 and the old base station 5-1 (e.g. while the IoT device 3 was communicating via Cell 1 of the base station 5-1).

When the IoT device 3 attempts to resume its RRC connection via the second base station 5-2 (via Cell 2), the IoT device 3 generates (using its RRC module 46) and sends, in step S501, and appropriately formatted signalling message requesting the second base station to resume the RRC connection for the IoT device 3. The RRC signalling message (e.g. an 'RRC Connection Resume Request' message) includes the Resume ID associated with the RRC connection to be resumed, and information identifying the old serving base station/cell (e.g. an associated ECGI, a base station identifier (eNB-ID), and/or a Physical Cell Identity (PCI)). The RRC signalling message may also include an authentication token and information identifying an associated bearer.

In step S503, based on the received information (e.g. Resume ID, ECGI, eNB-ID, PCI), the new base station 5-2 determines that the UE context associated with this IoT device 3 is not available at this base station 5-2 (e.g. because this particular Resume ID is not recognised by the resume ID association module 69 of the base station 5-2). However, the new base station 5-2 also determines that the UE context is stored by the first base station 5-1 (since the received ECGI, eNB-ID, and/or PCI is associated with the first base station 5-1).

Accordingly, the new base station 5-2 proceeds to generate (using its X2 module 67) and send, in step S505, an appropriately formatted signalling message to the old base station 5-1 for obtaining the UE context associated with the IoT device 3. The new base station 5-2 includes in this message (e.g. a 'UE Context Fetch Request' message) the Resume ID associated with the IoT device 3.

In response to this request, the old base station 5-1 retrieves the associated UE context from its memory 59 (UE context module 65), then sends, in step S507, the UE context to the new base station 5-2 by including the UE context in an appropriately formatted X2 signalling message (e.g. a 'UE Context Fetch Response' message).

Table 1 illustrates exemplary information elements (IEs) that may be included in the messages exchanged between the base stations when transferring the UE context associated with a resuming IoT device 3. In this example, the IEs include information identifying the IoT device 3 at the old base station 5-1 and at the new base station 5-2 (e.g. respective old/new eNB UE X2AP IDs), the associated Resume ID (and/or the like), and information (e.g. a list of E-RAB IDs) identifying any enhanced radio access bearers (E-RABs) to be transferred from the old base station 5-1 to the new base station 5-2.

Upon successful receipt of the UE context, the new base station 5-2 generates and sends, in step S509, an appropriately formatted signalling message (e.g. a 'UE Context Release' message) to the old base station 5-1 instructing the old base station 5-1 to release the UE context associated with the IoT device 3. In response to the UE context release request, the old base station 5-1 releases (e.g. removes from its UE context module 65) the UE context associated with the IoT device 3 (step S510).

TABLE 1

| | | | | | | |
|---|---|---|---|---|---|---|
| Context Response Message Structure | | | | | | |
| IE/Group Name | Presence | Range | IE type & reference | Semantics description | Criticality | Assigned Criticality |
| Message Type | M | | 9.2.13 | | YES | ignore |
| Old eNB UE X2AP ID | M | | eNB UE X2AP ID 9.2.24 | Allocated for handover at the old eNB and for dual connectivity at the eNB from which the E-RAB context is transferred | YES | reject |
| New eNB UE X2AP ID | M | | eNB UE X2AP ID 9.2.24 | Allocated for handover at the new eNB and for dual connectivity at the eNB to which the E-RAB context is transferred | YES | reject |

TABLE 1-continued

Context Response Message Structure

| IE/Group Name | Presence | Range | IE type & reference | Semantics description | Criticality | Assigned Criticality |
|---|---|---|---|---|---|---|
| Resume Id | M | | 9.2.z | | YES | reject |
| E-RABs Subject To Status Transfer List | | 1 | | | YES | ignore |
| >E-RABs Subject To Status Transfer Item | | 1 ... <maxnoolBearers> | | | EACH | ignore |
| >>E-RAB ID | M | | 9.2.23 | | — | — |

Beneficially, by informing the new base station 5-2 about its previously used cell/base station (using e.g. an associated ECGI, eNB-ID, and/or PCI), the IoT device 3 can avoid failing its resume operation via a different base station than the one previously used. Hence it is also not necessary for the IoT device 3 to carry out complicated new RRC connection setup procedures (assuming that UE context transfer is successful between the old and the new base station) or to include its UE context in the resume request (at step S501). In turn, this ensures that the overall procedure can be kept lightweight from the point of view of the IoT device 3.

Operation—Second Embodiment

FIG. 6 is a flowchart illustrating another exemplary process performed by components of the system 1 when performing a resumption of a data connection for an IoT device 3 via a base station that the IoT device 3 used before. In this case, the IoT device 3 attempts to resume its RRC connection by performing a legacy RRC connection request procedure.

Initially, as generally shown in step S600, the IoT device 3 and the base station 5-2 (which has previously served the IoT device 3) store the UE access stratum (AS) context associated with the IoT device 3. It will be appreciated that this UE AS context was generated during an earlier RRC connection between the IoT device 3 and this base station 5-2 (e.g. while the IoT device 3 was communicating via Cell 2—shown in dashed lines in FIG. 6). As shown, the UE AS context is indexed with an appropriate S-Temporary Mobile Subscriber Identity (S-TMSI) associated with the IoT device 3 and/or a random ID (e.g. a pseudo random number having a predetermined length, for example, in the range of 0 to $2^{40}-1$). It will be appreciated that, similarly to the AS context stored by the IoT device 3 and the base station 5-2, any associated non-access stratum (NAS) context may also be stored by the IoT device 3 and the MME 9.

When the IoT device 3 attempts to resume its RRC connection via the base station 5-2, the IoT device 3 generates (using its RRC module 46) and sends, in step S601, and appropriately formatted signalling message requesting the base station to establish an RRC connection for the IoT device 3. It will be appreciated that this message may be sent e.g. as message 3 of the random access procedure. The RRC signalling message (e.g. an 'RRC Connection Request' message or a 'Tracking Area Update' (TAU) message) includes the S-TMSI and/or random ID associated with the IoT device 3 (and hence identifies the earlier RRC connection to be resumed). Effectively, the S-TMSI and/or random ID serves as a Resume ID uniquely identifying the RRC connection to be resumed.

In other words, when the IoT device 3 attempts to connect using legacy procedures (and if the IoT device 3 has previously connected to this base station earlier), the IoT device 3 provides its Resume-ID (S-TMSI and random ID pair) in the RRC Connection Request it sends to the base station 5-2 (as the third message of the random access procedure). It will be appreciated that the S-TMSI is suitable for this purpose as it is 40 bits long. The Random ID adds an extra level of identification/verification, e.g. to ensure that the UE AS context held at the IoT device 3 and the UE AS context held at the base station 5 match.

Using its resume ID association module 69, the base station 5-2 looks up the Resume ID (S-TMSI and/or random ID) received from the IoT device 3. If the resume ID association module 69 finds this particular Resume ID, i.e. confirms that the base station 5-2 has the UE AS (and/or NAS) context for this IoT device 3, then the base station 5-2 proceeds to fetch (using its UE context module 65) the UE AS context (as generally shown in step S603). It will be appreciated that the S-TMSI and/or random ID (used as a Resume-ID) may be constructed in such a way that the base station 5-2 is able to determine, from the S-TMSI and/or random ID, which other network node (e.g. the base station 5-1 or the MME 9) has the context (even if the UE context is not held by the base station 5-2).

After this, the base station 5-2 proceeds to respond to the request received at step S601. However, instead of continuing with a conventional (new) RRC connection establishment procedure, the base station 5-2 generates (using its RRC module 66), and sends, in step S610, an appropriately formatted signalling message instructing the IoT device 3 to skip any security command and DRB setup (normally required at RRC connection setup). In this example, the base station 5-2 sends an 'RRC connection setup' message and includes in this message an appropriate indication (e.g. an appropriately formatted information element, flag, and/or the like) that is suitable to command the IoT device to skip (at least) a part of the RRC connection setup procedure (e.g. security command and DRB setup).

In step S612, the IoT device 3 responds to the RRC connection setup message from the base station 5, by generating (using its RRC module 46) and sending, in step S612, an appropriately formatted signalling message (e.g. an 'RRC connection setup complete' message) confirming that the IoT device 3 is skipping any security command and DRB setup procedures and resumes its previous RRC connection.

Accordingly, the IoT device 3 and the base station 5 do not need to perform a handshake when the IoT device 3 resumes its existing RRC connection (using an RRC connection request procedure). The IoT device 3 is thus able to restore its AS context (using its S-TMSI as a key), rather than having to generate it from scratch. This beneficially contributes to a faster and simpler implementation and hence improves the battery life for the IoT device. Thus, the IoT device 3 and the base station 5-2 are beneficially able to continue employing any AS Security and DRB setup used by the IoT device 3 earlier, rather than having to set them up each time the IoT device 3 connects to the network/resumes its connection.

As generally shown in step S615, the IoT device 3 and the base station 5-2 continue exchanging data using the existing (now resumed) RRC connection. The sending and receiving of any associated control data (e.g. tracking area update (TAU) related signalling) between the base station 5-2 and the MME 9 is shown using dashed lines in FIG. 6.

In this example, there is no need to involve the MME 9 in retrieving the AS context, and there is no need to use an explicit 'Resume' procedure and/or an explicit 'Resume ID' (the S-TMSI and/or random ID pair can be used instead).

Operation—Third Embodiment

FIG. 7 is a flowchart illustrating another exemplary process performed by components of the system 1 when performing a resumption of a data connection for an IoT device 3 via a base station 5. In this case, when resuming its data connection, the IoT device 3 follows a legacy RRC connection request procedure, and the (new) base station 5 obtains the UE context associated with the IoT device 3 from a suitable anchor point, such as the MME 9 (in this example).

Initially, as generally shown in step S700, the IoT device 3 and its old serving base station 5-1 store the UE context and an appropriate Resume ID associated with the IoT device 3. It will be appreciated that this UE context was generated during an earlier RRC connection between the IoT device 3 and the base station 5-1 (e.g. while the IoT device 3 was communicating via Cell 1 of the base station 5-1). As shown in dashed lines, at this point the second base station 5-2 may not hold any UE context associated with the IoT device 3 (e.g. if the IoT device 3 has not yet connected to this base station 5-2).

As generally shown in step S701, the old serving base station 5-1 is configured to forward the Resume ID associated with the IoT device 3 to the MME 9 (e.g. using an appropriately formatted S1 AP signalling message generated by its S1 AP module 68). In this example, the old serving base station 5-1 forwards the associated Resume ID when it forwards the Initial UE Message from the IoT device 3 to the MME 9. It will be appreciated that each serving base station may be configured to forward the associated Resume ID to the MMES when the IoT device 3 first attaches to that base station and/or when the IoT device 3 suspends its RRC connection via that base station. In step S702, the MME 9 stores the received Resume ID (e.g. using its UE context module 85).

When the IoT device 3 attempts to resume its RRC connection via the second base station 5-2 (via Cell 2), the IoT device 3 generates (using its RRC module 46) and sends, in step S703, and appropriately formatted signalling message requesting to connect to the second base station. The RRC signalling message (e.g. a 'Tracking Area Update' or an 'Attach Request' message) in this case comprises a regular RRC message (e.g. message 3 of the random access procedure) that is normally sent by user equipment for setting up a new RRC connection. Once the IoT device's 3 TAU/Attach request is accepted by the base station 5-2 (response not shown in FIG. 7), the IoT device 3 generates (using its RRC module 46) and sends, in step S704, a message confirming to the base station 5-2 that the RRC connection has been set up successfully (e.g. an 'RRC connection complete' message).

The new serving base station 5-2 forwards the Initial UE Message from the IoT device 3 to the MME 9 (in step S705). In this example, the new base station 5-2 does not include any Resume ID in its message to the MME 9 (since the base station 5-2 may not have any UE context for this IoT device 3 yet and/or because the IoT device 3 did not explicitly request resuming its existing connection).

However, as the MME 9 has a Resume ID for this IoT device 3, when it responds to the new base station's 5-2 message, the MME 9 includes the Resume ID in an appropriately formatted signalling message. Specifically, the MME 9 is configured to respond to the base station 5-2 by generating (using its S1AP module 88) and sending, in step S707, an appropriately formatted signalling message (e.g. an 'S1AP Initial Context Setup Request' and/or the like) requesting the base station 5-2 to create a UE context for the IoT device 3. This message also includes the Resume ID associated with the IoT device 3 and information identifying the old serving base station 5-1 (e.g. an associated eNB-ID, an eNB UE X2AP ID, and/or the like). Effectively, the message instructs to new serving base station 5-2 to fetch the existing UE context from the identified old serving base station 5-1 and resume the RRC connection previously used by the IoT device 3 via its previous serving base station 5-1.

As generally shown in step S709, if the supplied Resume ID is already known to the new base station 5-2 (stored in its Resume ID association module 69), then the base station 5-2 retrieves the corresponding UE context from its UE context module 65.

However, if the supplied Resume ID is not known to the new base station 5-2 (not found in its Resume ID association module 69), then the base station 5-2 proceeds to perform the procedure illustrated in steps S710 to S712 in order to fetch the UE context from the neighbour (old) base station 5-1 (identified by the MME 9 in step S707). It will be appreciated that steps S710 to S712 essentially correspond to steps S505 to S509 described above with reference to FIG. 5, thus their description is omitted herein for simplicity.

Next, the base station 5-2 generates (using its RRC module 66), and sends, in step S713, an appropriately formatted signalling message instructing the IoT device 3 to skip any security command and DRB setup (normally required at RRC connection setup). In this example, the base station 5-2 also includes in this message the Resume ID associated with the RRC connection to be resumed.

Accordingly, the IoT device 3 and the base station 5 do not need to perform a handshake when the IoT device 3 resumes its existing RRC connection (using legacy RRC connection request procedure). The IoT device 3 is thus able to restore its UE context and the new serving base station 5-2 is also able to restore or fetch the UE context, rather than having to generate it from scratch. This beneficially contributes to a faster and simpler implementation and hence improves the battery life for the IoT device.

As generally shown in step S715, the IoT device 3 and the new serving base station 5-2 can continue exchanging data using the resumed RRC connection.

In summary, in this example embodiment the IoT device follows a legacy RRC connection request procedure regardless of whether or not the new base station stores any UE AS context for this IoT device. There is no need for the IoT device to provide any Resume ID to the base station (e.g. in the form of an explicit Resume ID or an S-TMSI/Random ID), since the necessary information is provided by the anchor point/MME (and the UE context can be fetched from the old serving base station, if necessary).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the Resume ID may comprise an appropriate identifier made out of an ECGI/Global eNB-ID pair associated with the old base station to ensure its uniqueness across cells and to make it easy for the new base station to figure out where to fetch the UE context from. In this case, the IoT device may not need to provide the ECGI/PCI separately (e.g. in step S501).

It will be appreciated that instead of using an explicit context release request from the new base station (as shown in e.g. step S509), the old base station may be configured to release the UE context using a timer (e.g. after a predetermined amount of time has passed after transferring the UE context). In this case, the old base station may be configured to start a timer at step S507, and delete/release the UE context upon expiry of the timer.

When applicable, the Resume ID may also include information relating to the RRC Connection of the IoT device (e.g. an AS Security context, appropriate bearer related information, such as RoHC State and/or L1/L2 parameters).

It will be appreciated that the AS context associated with the IoT device may also be stored at a common anchor point (e.g. the MME and/or the S-GW) with an appropriate key to identify the anchor point. In this case, therefore, the new base station may be able to obtain the AS context from the anchor point (using the key).

It will be appreciated that the Resume ID may be supplied to the IoT device (by its serving base station) at the time of suspending the device's RRC connection. This would ensure that the Resume ID reflects the most up-to-date state of the RRC connection when the IoT device subsequently attempts to resume it.

It will be appreciated that the UE context release at the old base station (as described above with reference to step S510 of FIG. 5) may also involve releasing (at the old base station) any S1-MME and/or S1-U connection associated with the resuming IoT device. In this case, a new S1-U connection can be established for the IoT device between the new base station and the S-GW (e.g. similarly to the existing 'Path Switch Request' procedure).

It will be appreciated that instead of providing an ECGI associated with the old serving cell (e.g. as described above with reference to step S501), the IoT device may also include in its RRC connection resume request a cell radio network temporary identity (C-RNTI), a PCI, and/or an appropriate Message Authentication Code for data Integrity (MAC-I)—similarly to the information included in an RRC Connection Reestablishment request after a radio link failure or wrong handover).

In the above description of the exemplary procedure illustrated in FIG. 6, the base station is described to already hold the UE AS context for the IoT device attempting to resume an RRC connection. However, it will also be appreciated that the S-TMSI may be constructed such that it can indicate where to get the UE context from (e.g. based on ECGI, PCI, eNB-ID, MME-ID). Beneficially, in this case the new base station is able to fetch the UE context from the network node that includes this information. For example, the base station may fetch the UE context by following the procedures described above with reference to steps S503 to S509.

FIGS. 8 and 9 illustrate exemplary modifications to the procedure described above with reference to FIG. 7. However, in these examples, instead of the MME being an anchor point for storing the Resume ID (in step S702), the MME may be configured to forward the Resume ID for storing by the HSS (in step S802). Alternatively, the HSS may be able to derive the Resume ID from an International Mobile Subscriber Identity (IMSI) associated with the IoT device. Thus, when the MME responds to the Initial UE message (at step S807/S907), it includes in its message the Resume ID provided by the HSS. The other steps shown in FIGS. 8 and 9 correspond to like numbered steps described above with reference to FIG. 7.

As described above, the existing UE context may be stored by and passed from a suitable anchor point to the new base station as part of the resume operation. It will be appreciated that the MME, the HSS, and/or the S-GW may be configured to act as such an anchor point. FIGS. 10 and 11 illustrate two exemplary scenarios involving such a common anchor point for storing UE contexts.

As can be seen in step S1001 of FIG. 10, the old base station may be configured to transfer the UE context to the anchor point upon initially establishing the connection for the IoT device (in step S1000). It will be appreciated that step S1001 essentially corresponds to step S701 (although it also includes the UE context associated with the IoT device).

According to another option, generally illustrated in FIG. 11, the old base station may be configured to transfer the UE context to the anchor point at a later phase, e.g. upon suspending the connection for the IoT device (in step S1110).

According to yet another option, the old base station may be configured to transfer the UE context to the new base station directly, e.g. upon receiving an appropriate request from the new base station (e.g. as described above with reference to the 'UE Context Fetch Request' procedure shown in FIGS. 7 to 9).

FIG. 12 illustrates the scenario in which the new base station is unable to find (or obtain) the UE context for the IoT device attempting to resume its connection. Step S1203 corresponds to step S501 described above. However, as generally shown in step S1208, the base station (its Resume ID association module 69) cannot recognise the supplied Resume ID (from the IoT device or the MME/HSS) and/or cannot fetch the UE context from the old base station. Advantageously, in this case the base station is able to provide an appropriate error indication to the IoT device by generating (using its RRC module 66) and sending, in step S1209, an appropriately formatted random access response (and/or the like). In this example, the response (e.g. a random access message 3) comprises an 'RRC Connection Resume Failure' message and includes the Resume ID that is affected. The message may beneficially also include an appropriate error cause, e.g. 'Resume ID not found', 'UE context not available', 'resume operation not supported' and/or the like. Upon receipt of this response (and a failure cause, if any), the IoT device is able to fall back to legacy connection setup procedures and/or attempt to connect via a different base station (rather than attempting to resume its connection again via this base station).

It will be appreciated that whilst embodiments of the invention have been described with particular reference to Internet of Things (or machine-type) data transmissions (e.g. transmission of data acquired during measurement events and the like), the data sent may comprise any form of data depending on the application in which the communication device is being used. For example, the above example embodiments may be applicable for transmitting other data such as user data, backup data, synchronisation data, diagnostic data, monitoring data, usage statistics, error data and/or the like.

In the above example embodiments, the IoT devices are automated devices. It will be appreciated that the above embodiments might be implemented using other devices than automated equipment such as, for example, mobile telephones (smartphones), personal digital assistants, laptop/tablet computers, web browsers, e-book readers, etc.

In the above example embodiments, a 3GPP radio communications (radio access) technology is used. However, any other radio communications technology (i.e. WLAN, Wi-Fi, WiMAX, Bluetooth, etc.) can be used for managing transmissions of IoT devices in accordance with the above embodiments. The above embodiments are also applicable to 'non-mobile' or generally stationary user equipment.

Examples of IoT Applications

Some examples of Internet of Things (or MTC) applications are listed in the following table (source: 3GPP TS 22.368 V13.1.0, Annex B). This list is not exhaustive and is intended to be indicative of the scope of Internet of Things/machine-type communication applications.

TABLE 2

| Service Area | IoT applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer | Digital photo frame |

TABLE 2-continued

| Service Area | IoT applications |
| --- | --- |
| Devices | Digital camera |
| | eBook |

In the above description, the IoT device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, to the IoT device, or to other user equipment (such as mobile telephones) as a signal over a computer network, or on a recording medium. Further, the functionality performed by part or all of this software may be performed using one or more dedicated hardware circuits. However, the use of software modules is preferred as it facilitates the updating of the base station, the mobility management entity, or the IoT device (or a mobile telephone having IoT functionality, e.g. an MTC application) in order to update their functionalities.

The information indicating from where a context associated with a previously established communication connection can be retrieved may comprise information identifying a node (e.g. a neighbouring base station and/or a mobility management entity) from which the context associated with the previously established communication connection can be retrieved by the base station.

The controller of the base station may be configured to obtain the information indicating from where a context associated with a previously established communication connection can be retrieved from a message comprising the information (e.g. the request for establishing a communication connection or another message such as an S1-AP Initial Context Setup Request) received by the transceiver.

The information indicating from where a context associated with a previously established communication connection can be retrieved may comprise an information element identifying a communication node of the communication network, and wherein the controller is configured to retrieve the context from the communication node identified by the information element (e.g. from a neighbouring base station and/or a mobility management entity).

The transceiver of the base station may be configured to retrieve the context from the identified communication node by sending at least one signalling message (e.g. a 'UE Context Fetch Request') including information identifying the context (e.g. a Resume ID).

The transceiver of the base station may be configured to send (e.g. upon resuming the previously established communication connection) a request to the identified communication node for releasing the context at the identified communication node, the request including information identifying the context (e.g. a Resume ID).

The information indicating from where a context associated with a previously established communication connection can be retrieved may comprise information identifying a location, within a memory of the base station, from where a context associated with the previously established communication connection can be retrieved.

The context may comprise a user equipment (UE) context, such as an access stratum (AS) context and/or a non-access stratum (NAS) context.

The request for establishing a communication connection may comprise one of: a request for establishing a radio resource control (RRC) connection; and a request for resuming an RRC connection. The previously established communication connection may comprise a suspended/idle RRC connection.

The information indicating from where a context associated with a previously established communication connection can be retrieved may comprise at least one of: a resume ID; a temporary mobile subscriber identity, TMSI (e.g. an S-TMSI); a random ID; information identifying a base station and/or a cell (e.g. an eNB-ID); and information identifying the communication device for a base station (e.g. an eNB UE X2AP ID).

The controller of the base station may be configured to determine that the communication device had a previously established communication connection based on: the request for establishing a communication connection from the communication device; or a message from another communication node (e.g. a mobility management entity).

The transceiver of the base station may be operable to send a message to the communication device to cause the communication device to skip part of a procedure for establishing a communication connection (e.g. skipping an RRC security mode setup and/or a data radio bearer (DRB) setup). In this case, the transceiver of the communication device may be operable to receive a message from the base station to cause the communication device to skip part of a procedure for establishing a communication connection (e.g. skipping an RRC security mode setup and/or a data radio bearer (DRB) setup).

The transceiver of the base station may be configured to receive an indication that the communication device resumed the communication connection via another base station, in which case the controller may be configured to delete the context upon the transceiver receiving the indication.

The transceiver of the base station may be configured to retrieve the associated context upon resuming the communication connection with the communication device.

The message (from base station to the communication device) indicating that the previously established communication connection cannot be resumed may include information identifying an appropriate failure cause.

The communication device may comprise at least one of: user equipment according to a 3GPP standard; an 'internet of things' (IoT) device; a machine-type communications (MTC) device; a machine-to-machine (M2M) communication device; and a mobile telephone.

Various other modifications will be apparent to those skilled in the art and will not be described in further detail here.

The whole or part of the example embodiments disclosed above can be described as, but not limited to, the following supplementary notes.

(Supplementary note 1) A base station for a communication network, the base station comprising:
    a transceiver configured to:
        receive, from a communication device, a request for establishing a communication connection via a cell of the communication network operated by the base station; and
    a controller configured to:
        obtain information indicating from where a context associated with a previously established communication connection can be retrieved; and
    retrieve the context associated with the previously established communication connection based on the obtained information;
    wherein the base station is configured to resume the previously established communication connection with the communication device using the retrieved context.

(Supplementary note 2) The base station according to Supplementary note 1, wherein the information indicating from where a context associated with a previously established communication connection can be retrieved comprises information identifying a node (e.g. a neighbouring base station and/or a mobility management entity) from which the context associated with the previously established communication connection can be retrieved.

(Supplementary note 3) The base station according to Supplementary note 1 or 2, wherein the controller is configured to obtain the information indicating from where a context associated with a previously established communication connection can be retrieved from a message comprising the information (e.g. the request for establishing a communication connection or another message such as an S1-AP Initial Context Setup Request) received by the transceiver.

(Supplementary note 4) The base station according to Supplementary note 3, wherein the information indicating from where a context associated with a previously established communication connection can be retrieved comprises an information element identifying a communication node of the communication network, and wherein the controller is configured to retrieve the context from the communication node identified by the information element (e.g. from a neighbouring base station and/or a mobility management entity).

(Supplementary note 5) The base station according to Supplementary note 4, wherein transceiver is configured to retrieve the context from the identified communication node by sending at least one signalling message (e.g. a 'UE Context Fetch Request') including information identifying the context (e.g. a Resume ID).

(Supplementary note 6) The base station according to Supplementary note 4 or 5, wherein the transceiver is configured to send (e.g. upon resuming the previously established communication connection) a request to the identified communication node for releasing the context at the identified communication node, the request including information identifying the context (e.g. a Resume ID).

(Supplementary note 7) The base station according to Supplementary note 1, wherein the information indicating from where a context associated with a previously established communication connection can be retrieved comprises information identifying a location, within a memory of the base station, from where a context associated with the previously established communication connection can be retrieved.

(Supplementary note 8) The base station according to any one of Supplementary notes 1 to 7, wherein the retrieved context comprises a user equipment, UE, context, such as an access stratum, AS, context and/or a non-access stratum, NAS, context.

(Supplementary note 9) The base station according to any one of Supplementary notes 1 to 8, wherein the request for establishing a communication connection comprises one of: a request for establishing a radio resource control, RRC, connection; and a request for resuming an RRC connection.

(Supplementary note 10) The base station according to any one of Supplementary notes 1 to 9, wherein the previously established communication connection comprises a suspended/idle RRC connection.

(Supplementary note 11) The base station according to any one of Supplementary notes 1 to 10, wherein the information indicating from where a context associated with a previously established communication connection can be retrieved comprises at least one of: a resume ID; a temporary mobile subscriber identity, TMSI (e.g. an S-TMSI); a random ID; information identifying a base station and/or a cell (e.g. an eNB-ID); and information identifying the communication device for a base station (e.g. an eNB UE X2AP ID).

(Supplementary note 12) The base station according to any one of Supplementary notes 1 to 11, wherein the controller is configured to determine that the communication device had a previously established communication connection based on: the request for establishing a communication connection from the communication device; or a message from another communication node (e.g. a mobility management entity).

(Supplementary note 13) The base station according to any one of Supplementary notes 1 to 12, wherein the transceiver is operable to send a message to the communication device to cause the communication device to skip part of a procedure for establishing a communication connection (e.g. skipping an RRC security mode setup and/or a data radio bearer, DRB, setup).

(Supplementary note 14) A communication device for communicating via a cell of a communication network operated by a base station, the communication device comprising:
 a memory configured to hold a context associated with a previously established communication connection;
 a transceiver configured to:
  send, to the base station, a request for establishing a communication connection via a cell of the communication network operated by the base station, wherein the request for establishing a communication connection includes: information indicating that the communication device has a previously established communication connection with the communication network; and information indicating from where a context associated with the previously established communication connection can be retrieved; and
 a processor configured to resume the previously established communication connection, with the base station, using the context.

(Supplementary note 15) The communication device as claimed in Supplementary note 14, wherein the information indicating from where a context associated with a previously established communication connection can be retrieved comprises at least one of: information identifying a node (e.g. a base station and/or a mobility management entity) from which the context associated with the previously established communication connection can be retrieved; and information identifying a location, within a memory of the base station, from where a context associated with the previously established communication connection can be retrieved.

(Supplementary note 16) The communication device according to Supplementary note 14 or 15, wherein the context comprises a user equipment, UE, context, such as an access stratum, AS, context and/or a non-access stratum, NAS, context.

(Supplementary note 17) The communication device according to any one of Supplementary notes 14 to 16, wherein the request for establishing a communication connection comprises one of: a request for establishing a radio resource control, RRC, connection; and a request for resuming an RRC connection.

(Supplementary note 18) The communication device according to any one of Supplementary notes 14 to 17, wherein the information indicating from where a context associated with a previously established communication connection can be retrieved comprises at least one of: a resume ID; a temporary mobile subscriber identity, TMSI (e.g. an S-TMSI); a random ID; information identifying a base station and/or a cell (e.g. an eNB-ID); and information identifying the communication device for a base station (e.g. an eNB UE X2AP ID).

(Supplementary note 19) The communication device according to any one of Supplementary notes 14 to 18, wherein the transceiver is operable to receive a message from the base station to cause the communication device to skip part of a procedure for establishing a communication connection (e.g. skipping an RRC security mode setup and/or a data radio bearer, DRB, setup).

(Supplementary note 20) The communication device according to any one of Supplementary notes 14 to 19, wherein the communication device comprises at least one of: user equipment according to a 3GPP standard; an 'internet of things', IoT, device; a machine-type communications, MTC, device; a machine-to-machine, M2M, communication device; and a mobile telephone.

(Supplementary note 21) A base station for a communication network, the base station comprising:
 a controller configured to:
  establish a communication connection with a communication device and set up an associated context; and
  determine whether the communication connection is suspended; and
 a transceiver configured to:
  transfer said context to another communication node upon at least one of: the controller establishing the communication connection; the controller determining that the communication connection is suspended; and upon request.

(Supplementary note 22) Communication apparatus for a communication network, the communication apparatus comprising:
 a transceiver configured to receive, from a base station, a context associated with a communication connection involving the base station and a communication device;
 a memory configured to store the received context; and
 a controller configured to retrieve the stored context from memory and to initiate transfer, by the transceiver, of the retrieved context towards one of: the base station from which the context was originally received; and another base station;
 wherein said controller is configured to retrieve the stored context and to initiate said transfer upon receipt of information indicating that the communication connection is to be resumed and identifying said stored context.

(Supplementary note 23) A base station for a communication network, the base station comprising:
  a transceiver configured to:
    receive, from a communication device, a request for establishing a communication connection via a cell of the communication network operated by the base station; and
  a controller configured to:
    obtain information indicating from where a context associated with a previously established communication connection can be retrieved; and
    determine that the context associated with the previously established communication connection cannot be retrieved;
  wherein the transceiver is configured to send to the communication device and responsive to said determination that the context associated with the previously established communication connection cannot be retrieved, a message indicating that the previously established communication connection cannot be resumed.

(Supplementary note 24) The base station according to Supplementary note 23, wherein the message indicating that the previously established communication connection cannot be resumed includes information identifying an appropriate failure cause.

(Supplementary note 25) A system comprising the base station according to any one of Supplementary notes 1 to 13, 21, 23, and 24, and the communication device according to any one of Supplementary notes 14 to 20.

(Supplementary note 26) A method performed by a base station of a communications network, the method comprising:
  receiving, from a communication device, a request for establishing a communication connection via a cell of the communication network operated by the base station;
  obtaining information indicating from where a context associated with a previously established communication connection can be retrieved;
  retrieving the context associated with the previously established communication connection based on the obtained information; and
  resuming the previously established communication connection with the communication device using the retrieved context.

(Supplementary note 27) A method performed by a communication device the method comprising:
  holding a context associated with a previously established communication connection;
  sending, to the base station, a request for establishing a communication connection via a cell of the communication network operated by the base station, wherein the request for establishing a communication connection includes: information indicating that the communication device has a previously established communication connection with the communication network; and information indicating from where a context associated with the previously established communication connection can be retrieved; and
  resuming the previously established communication connection, with the base station, using the context.

(Supplementary note 28) A method performed by a base station for a communication network, the method comprising:
  establishing a communication connection with a communication device and setting up an associated context;
  determining whether the communication connection is suspended; and
  transferring said context to another communication node upon at least one of: the controller establishing the communication connection; the controller determining that the communication connection is suspended; and upon request.

(Supplementary note 29) A method performed by communication apparatus of a communication network, the method comprising:
  receiving, from a base station, a context associated with a communication connection involving the base station and a communication device;
  storing the received context;
  receiving information indicating that the communication connection is to be resumed and identifying said stored context; and
  retrieving, on receipt of said information, the stored context and initiating transfer of the retrieved context towards one of: the base station from which the context was originally received; and another base station.

(Supplementary note 30) A method performed by a base station for a communication network, the method comprising:
  receiving, from a communication device, a request for establishing a communication connection via a cell of the communication network operated by the base station;
  obtaining information indicating from where a context associated with a previously established communication connection can be retrieved;
  determining that the context associated with the previously established communication connection cannot be retrieved; and
  sending to the communication device, responsive to said determination that the context associated with the previously established communication connection cannot be retrieved, a message indicating that the previously established communication connection cannot be resumed.

(Supplementary note 31) A computer program product comprising computer implementable instructions for causing a programmable computer device to perform the method of any one of Supplementary notes 26 to 30.

The invention claimed is:

1. A first base station comprising:
  a controller; and
  a transceiver,
  wherein the controller is configured to:
    support a user equipment (UE) configured to perform optimization for a Cellular Internet of Things (CIoT) operation;
    control the transceiver to receive, from the UE, a radio resource control (RRC) message for re-establishing an RRC connection suspended between the UE and a second base station storing a UE context for the UE through a suspend procedure,
      wherein the RRC message includes a Radio Network Temporary Identifier (RNTI), and
      wherein the RNTI identifies the second base station
    retrieve the UE context based on the RNTI by controlling the transceiver to send a first signaling message including the RNTI to the second base station and controlling the transceiver to receive a second signaling message including the UE context from the second base station; and
    re-establish the RRC connection with the UE using the UE context.

2. The first base station according to claim 1, wherein the RNTI is an ID supplied to the UE by the second base station upon suspending the RRC connection.

3. The first base station according to claim 1, wherein the suspend procedure requires interaction between a core network node for control plane and a core network node for user plane.

4. The first base station according claim 1, wherein the controller is configured to determine that the RRC connection is suspended.

5. The first base station according to claim 1, wherein the RNTI is made based on an ID of the second base station.

6. The first base station according to claim 1, wherein the controller is configured to control the transceiver to send, after reception of the second signaling message, a request to the second base station for releasing the UE context at the second base station.

7. The first base station according to claim 1, wherein the RRC connection is a connection for an Internet of Things (IoT) device.

8. The first base station according to claim 1, wherein the controller is configured to control the transceiver to receive the RRC message in a case where Access Stratum (AS) security has not been activated.

9. A method performed by a first base station, the method comprising:
supporting a user equipment (UE) configured to perform optimization for a Cellular Internet of Things (CIoT) operation;
receiving, from the UE, a radio resource control (RRC) message for re-establishing an RRC connection suspended between the UE and a second base station storing a UE context for the UE through a suspend procedure,
wherein the RRC message includes Radio Network Temporary Identifier (RNTI), and
wherein the RNTI identifies the second base station;
retrieving the UE context based on the RNTI by sending a first signaling message including the RNTI to the second base station and receiving a second signaling message including the UE context from the second base station; and
re-establishing the RRC connection with the UE using the UE context.

10. The method according to claim 9, wherein the receiving is performed in a case where Access Stratum (AS) security has not been activated.

11. The method according to claim 10, wherein the RNTI is an ID supplied to the UE by the second base station upon suspending the RRC connection.

12. The method according to claim 10, wherein the suspend procedure requires interaction between a core network node for control plane and a core network node for user plane.

13. The method according to claim 10, further comprising determining that the RRC connection is suspended.

14. The method according to claim 10, wherein the RNTI is made based on an ID of the second base station.

15. The method according to claim 10, further comprising sending, after reception of the second signaling message, a request to the second base station for releasing the UE context at the second base station.

16. The method according to claim 10, wherein the RRC connection is a connection for an Internet of Things (IoT) device.

17. A user equipment (UE) comprising:
a controller; and
a transceiver,
wherein the controller is configured to:
perform optimization for a Cellular Internet of Things (CIoT) operation;
control the transceiver to send, to a first base station, a radio resource control (RRC) message for re-establishing an RRC connection suspended between the UE and a second base station storing a UE context for the UE through a suspend procedure,
wherein the RRC message includes a Radio Network Temporary Identifier (RNTI), and
wherein the RNTI identifies the second base station; and
re-establish the RRC connection with the first base station using the UE context,
wherein the UE context is retrieved based on the RNTI by sending a first signaling message including the RNTI from the first base station to the second base station and sending a second signaling message including the UE context from the second base station to the first base station.

18. A method for a user equipment (UE), the method comprising:
performing optimization for a Cellular Internet of Things (CIoT) operation;
sending, to a first base station, a radio resource control (RRC) message for re-establishing an RRC connection suspended between the UE and a second base station storing a UE context for the UE through a suspend procedure,
wherein the RRC message includes a Radio Network Temporary Identifier (RNTI), and
wherein the RNTI identifies the second base station; and
re-establishing the RRC connection with the first base station using the UE context,
wherein the UE context is retrieved based on the RNTI by sending a first signaling message including the RNTI from the first base station to the second base station and sending a second signaling message including the UE context from the second base station to the first base station.

* * * * *